United States Patent
Suzaki et al.

(10) Patent No.: US 7,525,729 B2
(45) Date of Patent: Apr. 28, 2009

(54) ZOOM LENS AND IMAGING APPARATUS

(75) Inventors: Mitsuhiro Suzaki, Tokyo (JP); Yusuke Nanjo, Kanagawa (JP); Atsuo Minato, Kanagawa (JP); Shinichi Arita, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/902,724

(22) Filed: Sep. 25, 2007

(65) Prior Publication Data
US 2008/0123191 A1 May 29, 2008

(30) Foreign Application Priority Data
Nov. 27, 2006  (JP)  ............... 2006-318908

(51) Int. Cl.
G02B 27/64  (2006.01)
G02B 15/14  (2006.01)

(52) U.S. Cl. .................. 359/557; 359/554; 359/676; 359/684

(58) Field of Classification Search ......... 359/554–557, 359/672–690; 396/52–55
See application file for complete search history.

(56) References Cited

U.S. PATENT DOCUMENTS 5,917,658 A * 6/1999 Yamanashi ............ 359/676
7,280,286 B2 * 10/2007 Hayakawa ............ 359/686
7,312,934 B2 * 12/2007 Iwasawa ............... 359/764
7,369,313 B2 * 5/2008 Otake .................. 359/557

FOREIGN PATENT DOCUMENTS

JP  2006-098963  4/2006

* cited by examiner

*Primary Examiner*—Thong Nguyen
(74) *Attorney, Agent, or Firm*—Rader Fishman & Grauer PLLC; Ronald P. Kananen

(57) ABSTRACT

There is provided a zoom lens having, in an order of an object-to-image direction, a first lens group having a positive refractive power and fixed with respect to an image plane; a second lens group having a negative refractive power; a third lens group having a positive refractive power and fixed with respect to an optical axis direction; a fourth lens group having a positive refractive power; and a fifth lens group having a positive refractive power and fixed with respect to the optical axis direction. The fifth lens group is composed of a fifth-a lens group having a negative refractive power; a fifth-b lens group having a positive refractive power; and a fifth-c lens group having a positive refractive power, arranged in the order of the object-to-image direction.

10 Claims, 23 Drawing Sheets

TRANSVERSE ABERRATION

TRANSVERSE ABERRATION

TRANSVERSE ABERRATION

TRANSVERSE ABERRATION

ZOOM LENS AND IMAGING APPARATUS

BACKGROUND OF THE INVENTION

1. Field of the Invention

The present invention relates to a zoom lens and an imaging apparatus. More specifically, the present invention relates to a zoom lens suitably used for cameras such as video cameras and digital still cameras, which are configured to detect light by image sensors of these cameras and are equipped with so-called anti-shaking functions adaptable to realize stabilization of a taken images in such a manner as to perform, by shifting a part of lens groups included in the zoom lens to have a component perpendicular with respect to an optical axis, optical correction of a taken-image blur resulting from oscillations of the zoom lens so as to obtain a blur free image, as well as to an imaging apparatus involving use of the zoom lens.

2. Description of Related Art

Blurring in an image is caused by camera shaking, such as those attributable to shutter releases at the time of image taking or those resulting from application of oscillations to an image taking system when an image taking is carried out on a moving object, such as automobiles. One means of correcting an image blurring caused by a camera shake as described above is an optical camera-shake correcting system of a type that provides shifting a part of lens groups included in a lens system in directions approximately perpendicular to an optical axis, shifting an image position to correct the image blur, and allowances for correction of optical performance degradation occurring in association with image position shift.

Specifically, a technology disclosed in Japanese Patent Application Publication No. 2006-98963 (Patent Document 1) is known. A zoom lens according to the Patent Document 1 includes an array of first to fourth lens groups, which are of positive, negative, positive, and positive refractive power lens groups, and a fifth lens group composed of a negative part group having a negative refractive power and a positive part group having a positive refractive power, wherein anti-shaking is performed by shifting the above positive part group in directions approximately perpendicular to an optical axis.

SUMMARY OF THE INVENTION

The zoom lens, according to Patent Document 1, has the fifth lens group whose negative part group is configured with a single negative lens, so that the refractive power of the negative part group becomes more intensive, resulting in a greater difference in refractive power from a lens closest to an image side among lenses of the positive part group included in the fifth lens group. For this reason, the zoom lens has a problem in that imaging performance degradation caused by relative eccentricity becomes more serious between the negative part group in the fifth lens group and the lens closest to the image side among the lenses of the positive part group in the fifth lens group.

The present invention has been undertaken in view of the above problem, and is intended to provide a zoom lens and an imaging apparatus with a smaller number of optical-axially movable lens groups for attainment of adaptation to miniaturization, as well as of reduction in imaging performance degradation caused by eccentricity.

A zoom lens according to one embodiment of the present invention includes, in an order from an object to an image direction, a first lens group having a positive refractive power and is fixed with respect to an image plane; a second lens group having a negative refractive power that is for zooming by moving on an optical axis; a third lens group having a positive refractive power and is fixed with respect to an optical axis direction; a fourth lens group having a positive refractive power and is for correcting fluctuations in imaging position by moving on the optical axis, as well as for correcting an imaging position change associated with a change in object distance; and a fifth lens group having a positive refractive power and is fixed with respect to the optical axis direction. The above fifth lens group is composed of, in the order from an object to an image direction, a fifth-a lens group having a negative refractive power, a fifth-b lens group having a positive refractive power, and a fifth-c lens group having a positive refractive power. The fifth-a lens group is configured with, in the order from an object to an image direction, two negative lenses including: a negative lens having a powerful concave surface facing toward an image and a negative lens having a powerful concave surface facing toward an object. A shift of the image is provided by shifting the fifth-b lens group so as to have a perpendicular component with respect to the optical axis, and a conditional expression (1) shown below is satisfied:

$$-4.0 < f5c/f5a < -1.5 \qquad (1)$$

where f5a is a focal length of the fifth-a lens group, and f5c is a focal length of the fifth-c lens group.

An imaging apparatus according to one embodiment of the present invention includes a zoom lens and an image sensor for converting an optical image formed by the above zoom lens into electric signals. The zoom lens includes, in an order of an object-to-image direction, a first lens group having a positive refractive power and is fixed with respect to an image plane; a second lens group having a negative refractive power and is for zooming by moving on an optical axis; a third lens group having a positive refractive power and is fixed with respect to an optical axis direction; a fourth lens group having a positive refractive power and is for correcting fluctuations in imaging position by moving on the optical axis, as well as for correcting an imaging position change associated with a change in object distance; and a fifth lens group having a positive refractive power and is fixed with respect to the optical axis direction. The fifth lens group includes, in the order of the object-to-image direction, a fifth-a lens group having a negative refractive power; a fifth-b lens group having a positive refractive power; and a fifth-c lens group having a positive refractive power. The fifth-a lens group is configured with, in the order of the object-to-image direction, two negative lenses including: a negative lens having a powerful concave surface facing toward an image and a negative lens having a powerful concave surface facing toward an object. A shift of the image can be provided by shifting the fifth-b lens group so as to have a perpendicular component with respect to the optical axis, and a conditional expression (1) shown below is satisfied:

$$-4.0 < f5c/f5a < -1.5 \qquad (1)$$

where f5a is a focal length of the fifth-a lens group, and f5c a focal length of the fifth-c lens group.

These and other features and aspects of the invention are set forth in detail below with reference to the accompanying drawings in the following detailed description of the embodiments.

DETAILED DESCRIPTION OF THE EMBODIMENTS

Figure 1:
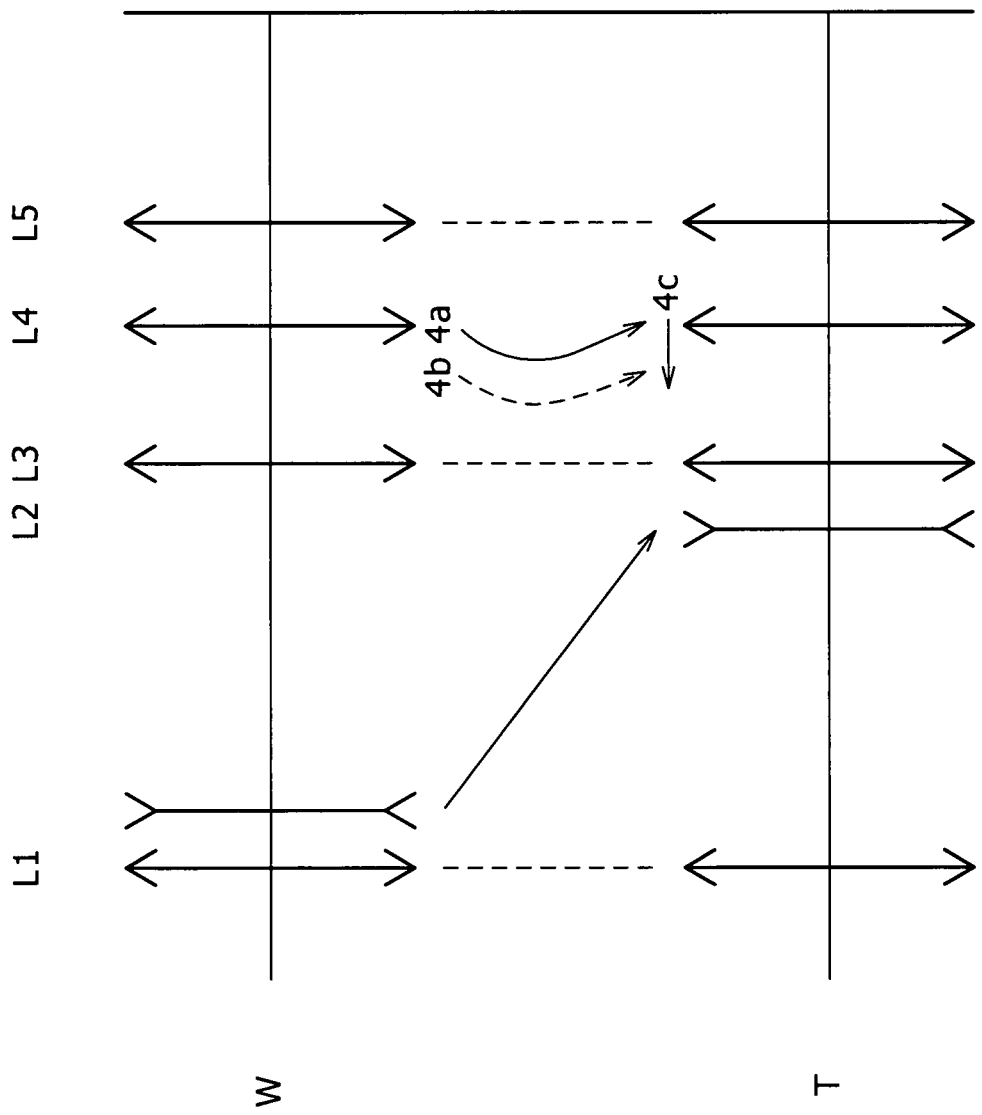
FIG. 1 is a schematic view showing a refractive power allocation with respect to embodiments of a zoom lens according to the present invention.

Hereinafter, embodiments of a zoom lens and an imaging apparatus according to embodiments of the present invention are described with reference to the drawings.

To begin with, a zoom lens of an embodiment is described.

The zoom lens of the present invention includes, in an order of an object-to-image direction, that is, in a direction from an object to an image, a first lens group; a second lens group; a third lens group; a fourth lens group; and a fifth lens group. The first lens group has a positive refractive power and is fixed with respect to an image plane. The second lens group has a negative refractive power and is for zooming by moving on an optical axis. The third lens group has a positive refractive power and is fixed with respect to an optical axis direction. The fourth lens group has a positive refractive power and is for correcting fluctuations in imaging position by moving on the optical axis, as well as for correcting an imaging position change associated with a change in object distance. The fifth lens group has a positive refractive power and is fixed with respect to the optical axis direction. The fifth lens group is composed of, in the order of the object-to-image direction, a fifth-a lens group having a negative refractive power; a fifth-b lens group having a positive refractive power; and a fifth-c lens group having a positive refractive power. The fifth-a lens group is configured with, in the order of the object-to-image direction, two negative lenses including a negative lens having a powerful concave surface facing toward an image and a negative lens having a powerful concave surface facing toward an object. A shift of the image is made possible by shifting the fifth-b lens group so as to have a perpendicular component with respect to the optical axis, and a conditional expression (1) shown below is satisfied:

$$-4.0 < f5c/f5a < -1.5 \tag{1}$$

where f5$a$ is a focal length of the fifth-a lens group, and f5$c$ is a focal length of the fifth-c lens group.

Therefore, the zoom lens according to the embodiment of the present invention may reduce imaging performance degradation caused by relative eccentricity between the fifth-a lens group and the fifth-c lens group by configuring the fifth-a lens group, which is specified as a negative part group included in the fifth lens group, with the two negative lenses of the negative lens having the powerful concave surface facing toward the image and the negative lens having the powerful concave surface facing toward the object. Specifically, the first to the fourth lens groups are applied to a configuration of a zoom lens scheme in terms of a refractive power allocation, by which a luminous flux exiting out of the fourth lens group converges. The resultant convergent luminous flux has to be turned back to a divergent luminous flux by the fifth-a lens group, so that the fifth-a lens group assumes the responsibility of providing an intensive negative refractive power. For this reason, over-side spherical aberration and/or over-side astigmatism easily arises from the fifth-a lens group. The fifth-a lens group, if configured such that significant aberrations as much as the above occur, that is, with a single negative lens, for instance, increases in sensitiveness to aberration degradation caused by manufacturing errors such as eccentricity and inclination, resulting in a difficulty in ensuring mass production. In the present specification, it is noted that what is meant by "a powerful concave surface facing toward an image" is that a radius of curvature of an image-side surface is smaller as compared with a radius of curvature (a plane is infinite) of an object-side surface, and that the image-side surface is in the shape of concavity to the image side. It is also noted that what is meant by "a powerful concave surface facing toward the object" is that a radius of curvature of an object-side surface is smaller as compared with the radius of curvature of the image-side surface (a plane is infinite), and that the object-side surface is in the shape of concavity to the object side.

Further, by giving satisfaction to the conditional expression (1), a reduction in total lens length may be attained, and the imaging performance degradation caused by the relative eccentricity between the fifth-a lens group and the fifth-c lens group may be reduced.

The above conditional expression (1) is to define the range of a ratio of refractive power intensity of the fifth-c lens group to refractive power intensity of the fifth-a lens group. When an upper limit of the conditional expression (1) is exceeded, the refractive power of the fifth-a lens group becomes less intensive, and at the same time, the refractive power of the fifth-c lens group becomes more intensive, so that a difference in refractive power between the fifth-a lens group and the fifth-c lens group becomes greater, resulting in an increase in the imaging performance degradation caused by the relative eccentricity between the fifth-a lens group and the fifth-c lens group. Conversely, when a lower limit of the conditional expression (1) is not reached, the refractive power of the fifth-a lens group becomes more intensive, and at the same time, the refractive power of the fifth-c lens group becomes less intensive, so that an increase in total lens length is caused, and at the same time, the difference in refractive power between the fifth-a lens group and the fifth-c lens group becomes also greater, resulting in the increase in the imaging performance degradation caused by the relative eccentricity between the fifth-a lens group and the fifth-c lens group, as well.

It is noted that if an aperture stop is placed in the vicinity of the third lens group in such a manner that the second and the fourth lens groups specified as shift lens groups allowed to move during a change in lens positional condition from a wide-angle end or a maximum wide angle state to a telephoto end or a maximum telephoto state are located with the aperture stop between them, it is possible to satisfactorily correct off-axial aberration occurring in association with the change in lens positional condition, while eliminating a need for a larger-sized lens diameter. Further, this arrangement ensures that the fifth lens group takes its position away from the aperture stop, so that a drive mechanism for shifting a part (or the above fifth-b lens group) of the positive part groups included in the fifth group in directions approximately perpendicular to the optical axis is prevented from interference with a drive mechanism for driving the second lens group and/or the aperture stop. For this reason, the drive mechanism can be more freely arranged, and at the same time, a need for a larger-sized lens mount configuration may be eliminated. Furthermore, an attempt to shift not the negative part group in the fifth lens group but the positive part group therein is made, so that it is possible to suppress an occurrence of distortion.

In addition, a lens system has, on the side closest to the image, the fifth lens group fixed in position during zooming, so that various aberrations are corrected on the lens surface when exiting rays are more distant from the optical axis, resulting in attainment of satisfactory aberration correction in the overall zooming area, with a wide-angle focus length held.

In the zoom lens according to one embodiment of the present invention, it is desirable that a conditional expression (2) shown below is satisfied:

$$0.25 < f5b/ft < 0.4 \quad (2)$$

where f5b a focal length of the fifth-b lens group, and ft is a focal length of the overall lens system in the telephoto end position.

This may give satisfactory correction to negative spherical aberration and at the same time, may achieve, by a smaller amount of shift of the positive part group in the directions approximately perpendicular to the optical axis, correction of image position fluctuations caused by a camera shake.

The conditional expression (2) is to define the range of the refractive power intensity of the fifth-b lens group, in other words, to define requirements for an increase in sensitiveness for an anti-shaking purpose, as well as for achievement of satisfactory aberration correction covering the overall zooming area. When an upper limit of the conditional expression (2) is exceeded, the sensitiveness for anti-shaking purpose so increases as to permit contributions towards the smaller amount of lens shift at the time of camera-shake correction, whereas the image plane undergoes over-correction, resulting in a difficulty in ensuring a balance with the spherical aberration. Conversely, when a lower limit of the conditional expression (2) is not reached, satisfactory aberration balance is ensured, whereas the sensitiveness for anti-shaking purpose so decreases as to cause a greater amount of lens shift at the time of camera-shake correction, resulting in the need for a larger-sized lens configuration.

In the zoom lens according to one embodiment of the present invention, it is desirable that a conditional expression (3) shown below it satisfied:

$$5 < f5/|f5a| < 7 \quad (3)$$

where f5 is a focal length of the fifth lens group. This ensures a back focus of a desired length and also permits an overall lens system size to be balanced.

The conditional expression (3) is to define a range of the refractive power intensity of the fifth-a lens group included in the fifth lens group. When an upper limit of the conditional expression (3) is exceeded, and with more intensive refractive power of the fifth-a lens group, the increase in total lens length is caused. Conversely, when a lower limit of the conditional expression (3) is not reached, the refractive power of the fifth-a lens group becomes less intensive, resulting in a difficulty in ensuring a long back focus.

In the zoom lens according to one embodiment of the present invention, it is desirable that a conditional expression (4) shown below is satisfied:

$$1.5 < f5/f5c < 2.5. \quad (4)$$

This achieves more satisfactory correction of various aberrations, and at the same time, may suppress eccentric aberration (decentering aberration) occurring at the time of image blur correction, and image plane shift is further made controllable.

The conditional expression (4) is to define the range of the refractive power intensity of the fifth-c lens group included in the fifth lens group. When an upper limit of the conditional expression (4) is exceeded, and with more intensive refractive power of the fifth-c lens group, it is advantageous in reduction in total lens length, whereas it becomes difficult to correct image-plane curvature and distortion fluctuations covering the overall zooming area. Conversely, when a lower limit of the conditional expression (4) is not reached, and with less intensive refractive power of the fifth-c lens group, the total lens length increases.

In the zoom lens according to one embodiment of the present invention, it is desirable that a conditional expression (5) shown below is satisfied:

$$2.5 < f5/(fw \cdot ft)^{1/2} < 4 \quad (5)$$

where fw is a focal length of the overall lens system in the wide-angle end position.

This provides a wider angle of view, together with the satisfactory aberration correction covering the overall zooming area.

The conditional expression (5) is to define the range of the refractive power intensity of the fifth lens group for the sake of widening an angle of view in a wide-angle end, in other words, to define requirements for attainment of the wider angle of view together with satisfactory aberration correction covering the overall zooming area. Specifically, when an upper limit of the conditional expression (5) is exceeded, the angle of view may be made wider than ever with respect to the wide-angle end, whereas the image plane undergoes overcorrection, resulting in the difficulty in ensuring the balance with the spherical aberration. Conversely, when a lower limit of the conditional expression (5) is not reached, the satisfactory aberration balance is ensured, whereas the wider angle of view is impossible of attainment.

In the zoom lens according to one embodiment of the present invention, it is desirable that a conditional expression (6) shown below is satisfied.

$$0.8 < f5b/(fw \cdot ft)^{1/2} < 1.0 \quad (6)$$

This may suppress the eccentric aberration occurring at the time of image blur correction, and may reduce the amount of shift of camera-shake correcting lens group at the time of camera-shake correction.

The conditional expression (6) is to define the range of the refractive power intensity of the fifth lens group for the sake of reducing the amount of shift of the camera-shake correcting lens group at the time of camera-shake correction, in other words, to define the requirements for achievement of satisfactory aberration correction covering the overall zooming area. Specifically, when an upper limit of the conditional expression (6) is exceeded, the amount of shift of the camera-shake correcting lens group at the time of camera-shake correction may be made smaller, whereas it becomes difficult to achieve the aberration correction at the time of camera-shake correction. Conversely, when a lower limit of the conditional expression (6) is not reached, the improved aberration balance is ensured, whereas the amount of shift of the camera-shake correcting lens group for camera-shake correction is made greater, resulting in a failure to realize a smaller-sized lens diameter.

It is noted that it is preferably necessary to satisfy all the above conditional expressions of (1) to (6) for the purpose of realizing the satisfactory aberration correction, minimizing the aberration fluctuations occurring at the time of camera-shake correction, and besides, ensuring the reduction in total lens length, as well as in outer lens diameter size. However, if any one of the above conditional expressions is satisfied, it is possible to produce the effects contained in the above description of the conditional expressions concerned.

In the zoom lens according to one embodiment of the present invention, it is desirable that the above fifth-b lens group is configured with a cemented lens made up of a positive lens and a negative lens which are in an order of the object-to-image direction.

This permits the correcting lens group for anti-shaking purpose to be configured as minimized to ensure that size and weight reductions of the correcting lens group are attained. For this reason, the actuator for driving the correcting lenses may be miniaturized, so that the reduction in overall apparatus size is realized, and at the same time, more power saving during driving is also ensured. On the other hand, the fifth-b lens group, if configured in such a manner that the positive lens and the negative lens are separated from each other, remarkably increases in the aberration degradation caused by errors of gap, eccentricity and inclination between the separated positive and negative lenses, causing mass productivity to be degraded. However, in this case, the above disadvantages are made avoidable by configuring the fifth-b lens group with a cemented lens made up of one-grouped two lenses.

It is preferably necessary to reduce an amount of chromatic aberration arising from the fifth-b lens group in order to attain a sufficient reduction in chromatic aberration fluctuations occurring at the time of anti-shaking. It is better to configure the fifth-b lens group with the cemented lens made up of a set of positive lens and negative lens, as far as the aberration correction goes. As such, the chromatic aberration correction of the fifth-b lens group itself becomes facilitated, while making more intensive the refractive power of the fifth-b lens group, so that it becomes possible to meet both the increase in sensitiveness for anti-shaking purpose and the reduction in chromatic aberration fluctuations occurring at the time of anti-shaking. As a result, using a low-dispersion glass material for the fifth-b lens group makes it possible to hold down, to an unquestionable level, the chromatic aberration fluctuations occurring at the time of anti-shaking, while ensuring the required sensitiveness for anti-shaking purpose by setting the refractive power of the fifth-b lens group optimally.

It is noted that configuring the fifth-b lens group whose object-side surface is of aspherical shape makes it possible to suppress the spherical aberration arising from the fifth lens group, and also to reduce eccentric comatic aberration occurring at the time of anti-shaking.

In the zoom lens according to one embodiment of the present invention, it is desirable that the fourth lens group is configured with a three-cemented lens made up of a positive lens, a negative lens, and a positive lens, which are in the order of the object-to-image direction.

This permits the off-axial aberration to be corrected simultaneously with the axial aberration, enabling the satisfactory correction of various aberration fluctuations occurring in association with a change in the subject position.

Then, cementing the positive lens to each of the front and the rear of the negative lens makes it possible to particularly increase the allowable degree of freedom with respect to a negative lens curvature, as compared with the related art, permitting contributions toward considerable amelioration in spherical aberration chromatic curves arising from the negative lens surface.

In the zoom lens according to one embodiment of the present invention, it is desirable that the image is formed on a solid-state image sensor.

Forming the image on the solid-state image sensor makes it possible to administer to a user's convenience in such a manner as to record photoelectrically converted images on a memory or a tape.

Specific embodiments of the zoom lens according to the present invention and numerical embodiments involving application of actual numerical values to the above specific embodiments are now described with reference to drawings and tables.

It is noted that an aspherical surface is introduced in each embodiment, where the shape of the above aspherical surface is to be defined by an Expression 1 shown below.

$$x = \frac{cy^2}{1 + \sqrt{1 - (1+k)c^2y^2}} + Ay^4 + By^6 + \Lambda \quad \text{Expression 1}$$

where y is a height from the optical axis, x is a sag amount, c is a curvature, K is a conic constant, and A, B, . . . are aspherical coefficients.

FIG. 1 illustrates a refractive power allocation with respect to the zoom lens according to each embodiment of the present invention. In the figure, a first lens group L1 having a positive refractive power, a second lens group L2 having a negative refractive power, a third lens group L3 having a positive refractive power, a fourth lens group L4 having a positive refractive power, and a fifth lens group L5 having a positive refractive power are included in the order of an object-to-image direction. In zooming from the wide-angle end position to the telephoto end position, the second lens group L2 is moved toward the image in such a manner that an air gap between the first lens group L1 and the second lens group L2 is widened, and a narrower air gap between the second lens group L2 and the third lens group L3 results. During the zooming, the first lens group L1, the third lens group L3, and the fifth lens group L5 are fixed in position, and by contrast, the fourth lens group L4 is supposed to undergo movement so as to correct image-plane position fluctuations associated with movement of the second lens group L2, and is also moved toward the object during close-distance focusing.

Figure 2:
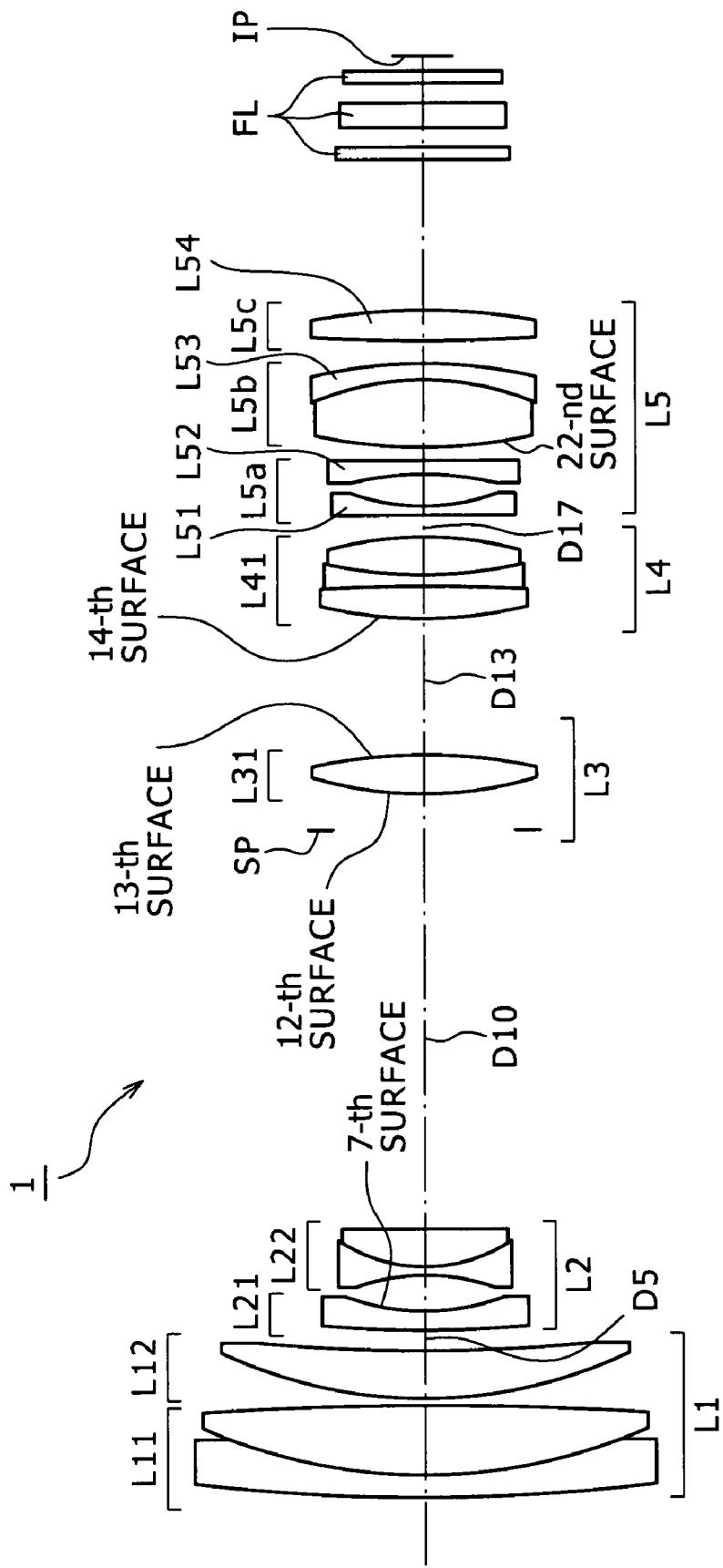
FIG. 2 shows a lens configuration with respect to a first embodiment of the zoom lens according to the present invention.

FIG. 2 shows a lens configuration of a zoom lens 1 according to a first embodiment of the present invention. The first lens group L1 is composed of, in the order of the object-to-image direction, a cemented lens L11 made up of a meniscus-shaped negative lens having a convex surface facing toward the object and a positive lens having a convex surface facing toward the object, and a positive lens L12 having a convex surface facing toward the object. The second lens group L2 is composed of, in the order of the object-to-image direction, a meniscus-shaped negative lens L21 having a concave surface facing toward the image and whose image-side surface is of aspherical shape, and a cemented lens L22 made up of a biconcave lens and a biconvex lens. The third lens group L3 is composed of a convexo-convex lens L31 whose opposite surfaces are of aspherical shape. The fourth lens group L4 is composed of a three-cemented lens L41 made up of, in order of the object-to-image direction, a biconvex lens, a biconcave lens, and a biconvex lens and whose object-side surface is of aspherical shape. The fifth lens group L5 is made up of, in the order of the object-to-image direction, a fifth-a lens group L5a composed of a meniscus-shaped negative lens L51 having a concave surface facing toward the image and a negative lens L52 having a concave surface facing toward the object, a fifth-b lens group L5b composed of a cemented lens L53 made up of a biconvex lens and a meniscus-shaped negative lens having a concave surface facing toward the object, and a fifth-c lens group L5c composed a biconvex lens L54. In addition, an aperture stop SP is located on the object side of the third lens group L3, and is fixed with respect to the optical axis direction during the zooming from the wide-angle end position to the telephoto end position. Further, a filter FL is placed between the fifth lens group L5 and an image plane IP. And, a shift of the image is made possible by shifting the fifth-b lens group L5b included in the fifth lens group L5 so as to have a perpendicular component with respect to the optical axis.

Lens data with respect to a numerical embodiment 1 involving application of actual numerical values to the zoom lens 1 according to the first embodiment is listed in Table 1. It is noted that in Table 1 and the subsequent lens data tables, "Surface number" indicates a surface specified as the i-th from the object side, "Radius of curvature" indicates a radius of curvature of the i-th surface from the object side, "Surface gap" indicates an axial surface gap between the i-th surface from the object side and the i+1-th surface, "Refractive index" indicates a refractive index with respect to a d-line of a glass material having the i-th surface on the object side, and "Abbe number" indicates an Abbe number with respect to the d-line of the glass material having the i-th surface on the object side. In addition, "∞" used in reference to the radius of curvature indicates that the surface concerned is of plane shape, and "(Di)" used in reference to the surface gap indicates that the surface gap concerned is variable.

TABLE 1

| SURFACE NUMBER | RADIUS OF CURVATURE | SURFACE GAP | REFRACTIVE INDEX | ABBE NUMBER | |
|---|---|---|---|---|---|
| 1 | 17.18922 | 0.154213 | 1.84666 | 23.8 | |
| 2 | 4.23963 | 0.600627 | 1.61800 | 63.4 | |
| 3 | −21.41853 | 0.034270 | | | |
| 4 | 4.17872 | 0.392559 | 1.88300 | 40.8 | |
| 5 | 19.61851 | (D5) | | | |
| 6 | 19.61851 | 0.102809 | 1.85135 | 40.1 | |
| 7 | 1.78245 | 0.312368 | | | |
| 8 | −1.93843 | 0.077107 | 1.88300 | 40.8 | |
| 9 | 1.85798 | 0.258307 | 1.94595 | 18.0 | |
| 10 | −85.67412 | (D10) | | | |
| 11 | ∞ | 0.270730 | | | (APERTURE STOP) |
| 12 | 2.97511 | 0.301436 | 1.58313 | 59.5 | |
| 13 | −5.91741 | (D13) | | | |
| 14 | 4.02156 | 0.249689 | 1.69350 | 53.2 | |
| 15 | −20.99887 | 0.085674 | 1.80518 | 25.5 | |
| 16 | 3.13511 | 0.323283 | 1.62041 | 60.3 | |
| 17 | −3.13511 | (D17) | | | |
| 18 | 31.70811 | 0.085674 | 1.80420 | 46.5 | |

TABLE 1-continued

| SURFACE NUMBER | RADIUS OF CURVATURE | SURFACE GAP | REFRACTIVE INDEX | ABBE NUMBER |
|---|---|---|---|---|
| 19 | 1.93614 | 0.256543 | | |
| 20 | −3.17312 | 0.085674 | 1.69680 | 55.5 |
| 21 | ∞ | 0.119944 | | |
| 22 | 3.34307 | 0.529141 | 1.76802 | 49.2 |
| 23 | −2.22654 | 0.119944 | 1.84666 | 23.8 |
| 24 | −4.24420 | 0.171348 | | |
| 25 | 8.76381 | 0.252276 | 1.69680 | 55.5 |
| 26 | −6.61472 | 1.183725 | | |
| 27 | ∞ | 0.073680 | 1.51680 | 64.2 |
| 28 | ∞ | 0.171348 | | |
| 29 | ∞ | 0.191910 | 1.55232 | 63.4 |
| 30 | ∞ | 0.171348 | | |
| 31 | ∞ | 0.085674 | 1.51680 | 64.2 |
| 32 | ∞ | (Bf) | | |

With respect to the zoom lens 1, the image-side surface (the seventh surface) of the meniscus-shaped negative lens L21 included in the second lens group L2, the opposite surfaces (the twelfth and the thirteenth surfaces) of the biconvex lens L31 included in the third lens group L3, the object-side surface (the fourteenth surface) of the three-cemented lens L41 included in the fourth lens group L4, and the object-side surface (the twenty-second surface) of the fifth-b lens group L5b included in the fifth lens group L5 are of aspherical shape. As such, the fourth-, the sixth-, the eighth- and the tenth-order aspherical coefficients A, B, C, and D of the above surfaces with respect to the numerical embodiment 1 are listed in Table 2 together with their conic constants ($\kappa$). It is noted that in Table 2 and the subsequent aspherical coefficient tables, "E−i" is an exponential notation to a base ten number, in other words, "$10^{-i}$", specifically, "0.12345E−05" represents "$0.12345 \times 10^{-5}$", for instance.

TABLE 2

| | $\kappa$ | A | B | C | D |
|---|---|---|---|---|---|
| 7th SURFACE | 0.000000 | −0.641412E−02 | 0.120103E−01 | 0.261716E−01 | −0.598031E−01 |
| 12th SURFACE | 0.000000 | −0.129016E−01 | −0.311088E−02 | 0.000000 | 0.000000 |
| 13th SURFACE | 0.000000 | 0.290047E−02 | −0.143093E−02 | 0.000000 | 0.000000 |
| 14th SURFACE | 0.000000 | −0.159469E−01 | 0.394503E−03 | −0.365098E−03 | 0.392693E−02 |
| 22nd SURFACE | 0.000000 | −0.148385E−01 | 0.279641E−02 | −0.115295E−02 | 0.000000 |

With respect to the zoom lens 1, when zooming from the wide-angle end position to the telephoto end position, a surface gap D5 between the first lens group L1 and the second lens group L2, a surface gap D10 between the second lens group L2 and the third lens group L3 (or the aperture stop SP), a surface gap D13 between the third lens group L3 and the fourth lens group L4, and a surface gap D17 between the fourth lens group L4 and the fifth lens group L5 are supposed to undergo changes. As such, values for each of the above surface gaps with respect to the numerical embodiment 1 in the wide-angle end position (f=1.000), the intermediate focal length position (f=4.525), and the telephoto end position (f=9.05) are listed in table 3 together with focal lengths f, F-numbers FNO and angles of view 2ω.

TABLE 3

| f | 1.00 | 4.525 | 9.05 |
|---|---|---|---|
| FNO | 1.85 | 2.38 | 2.89 |
| 2ω | 62.01 | 13.98 | 6.89° |
| D5 | 0.163 | 2.408 | 3.192 |
| D10 | 3.233 | 0.988 | 0.204 |
| D13 | 1.108 | 0.421 | 0.974 |
| D17 | 0.161 | 0.849 | 0.295 |
| Bf | 0.137 | 0.137 | 0.137 |

Corresponding values to the above conditional expressions of (1) to (6) with respect to the numerical embodiment 1 are listed in Table 4.

[Table 4]

$$f5c/f5a = -3.4355 \qquad (1)$$

$$f5b/ft = 0.3118 \qquad (2)$$

$$f5/|f5a| = 5.7369 \qquad (3)$$

$$f5/f5c = 1.552 \qquad (4)$$

$$f5/(fw \cdot ft)^{1/2} = 2.7976 \qquad (5)$$

$$f5b/(fw \cdot ft)^{1/2} = 0.8724 \qquad (6)$$

Figure 3:
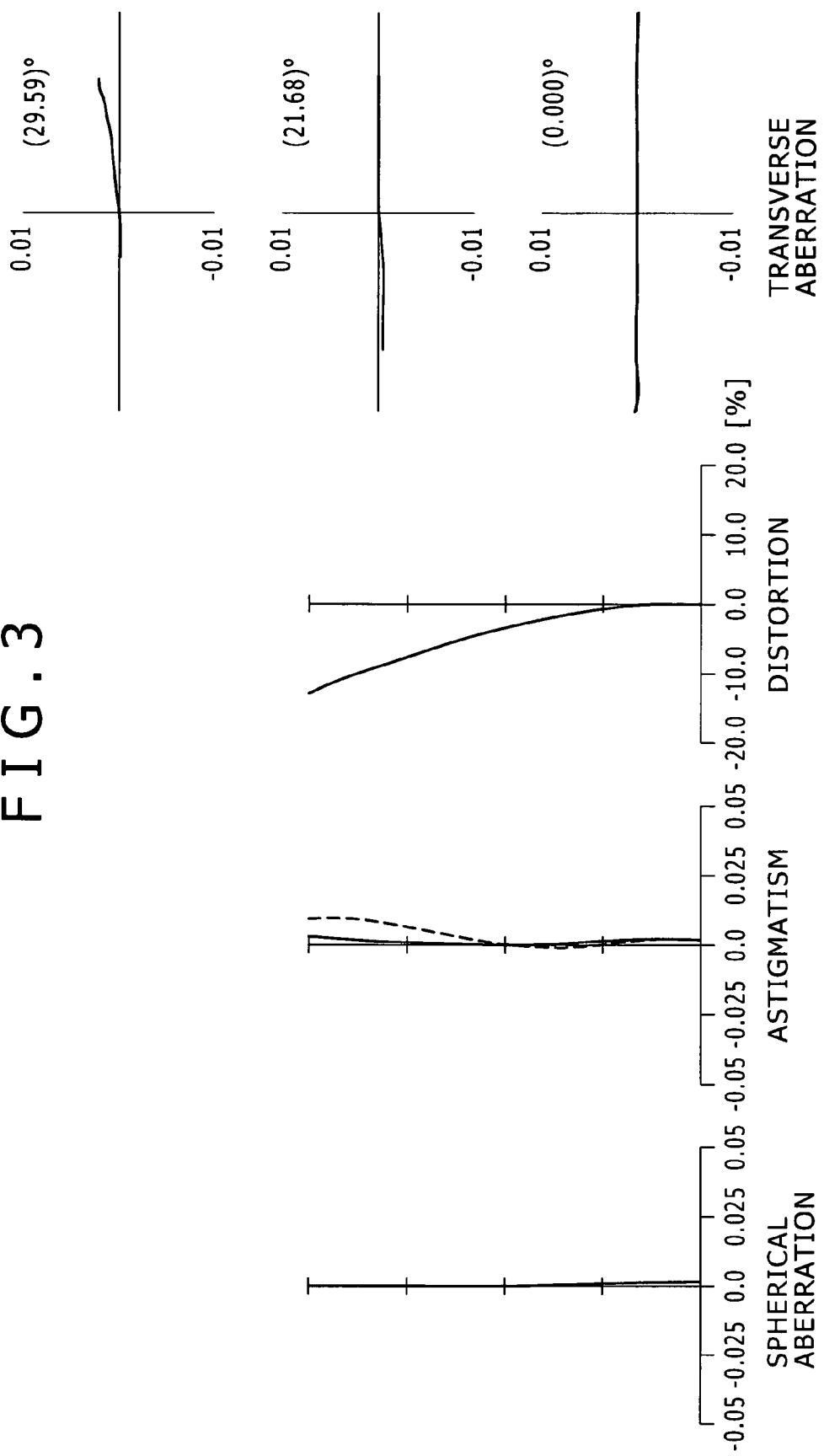
FIGS. 3 to 5 respectively illustrate graphs of various aberrations with respect to a numerical embodiment 1 involving application of actual numerical values to the first embodiment, where graphs in FIG. 3 show spherical aberration, astigmatism, distortion, and transverse aberration at a wide-angle end position; those in FIG. 4 show spherical aberration, astigmatism, distortion, and transverse aberration at an intermediate focal length position; and those in FIG. 5 show spherical aberration, astigmatism, distortion, and transverse aberration at a telephoto end position.
Figure 4:
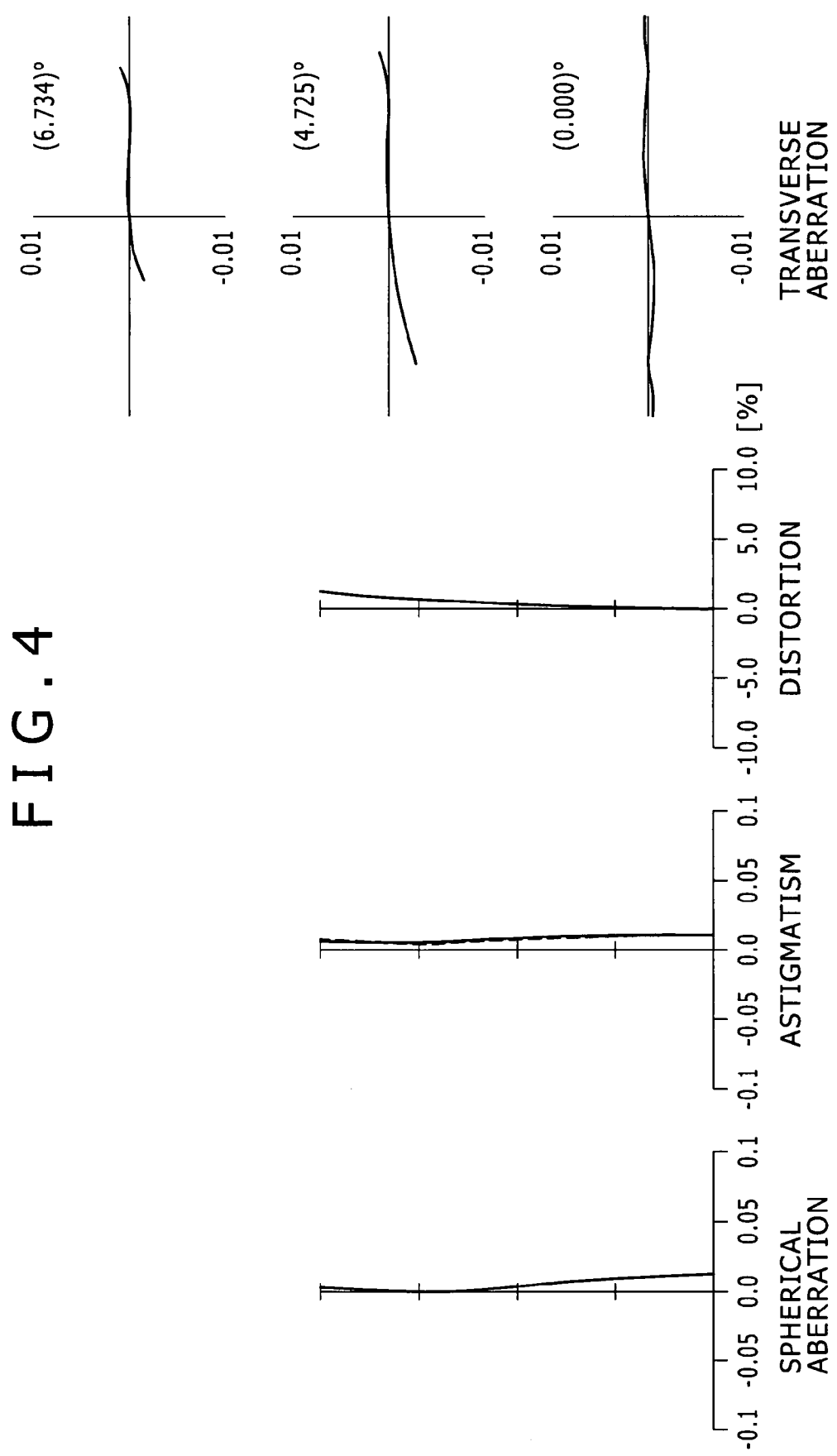
Figure 5:
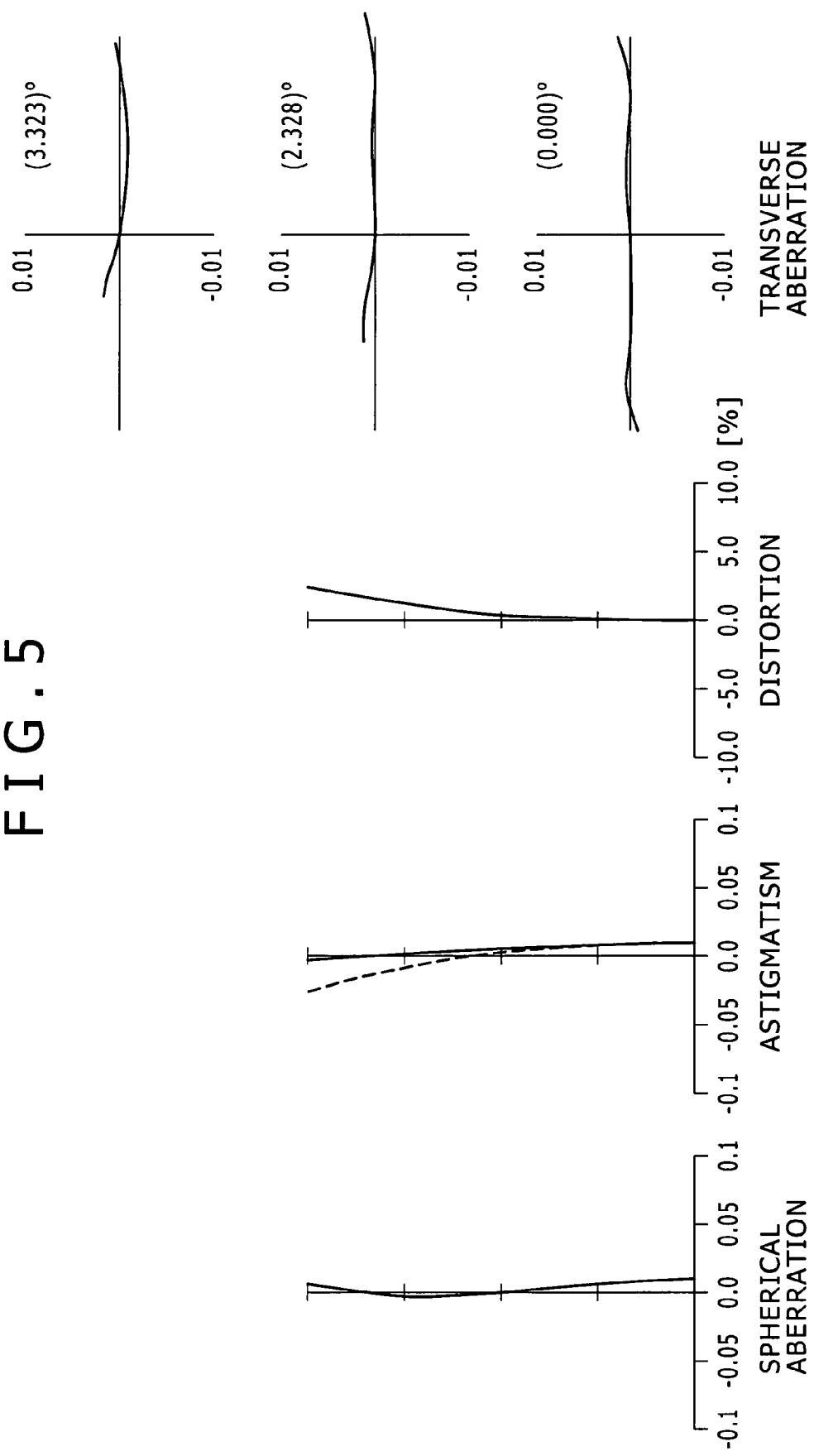

FIGS. 3 to 5 respectively illustrate graphs of various aberrations with respect to the numerical embodiment 1 in an in-focus condition at infinity, where graphs in FIG. 3 show various aberrations in the wide-angle end position (f=1.000), those in FIG. 4 show various aberrations in the intermediate focal length position (f=4.525), and those in FIG. 5 show various aberrations in the telephoto end position (f=9.05).

Figure 6:
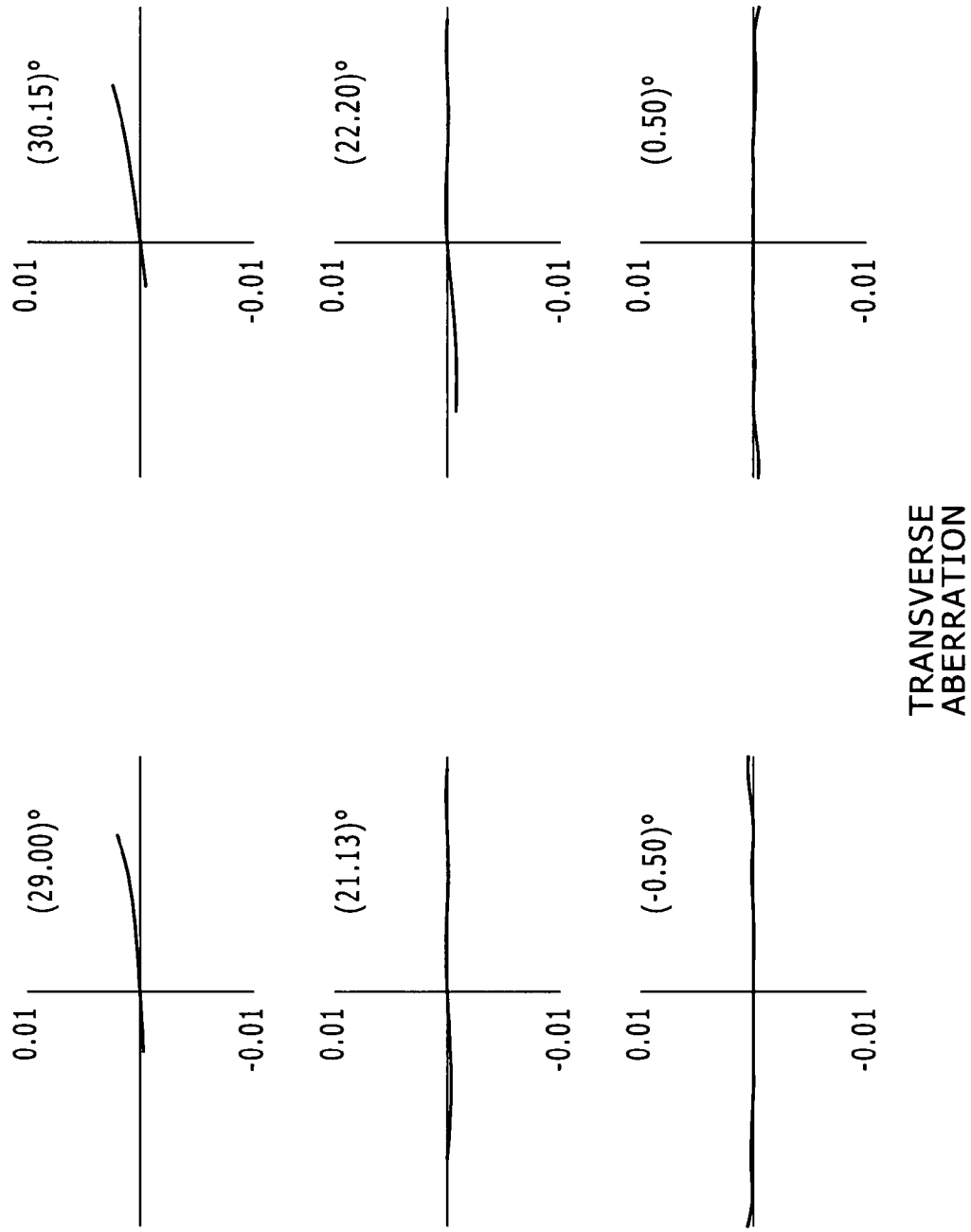
FIGS. 6 to 8 respectively illustrate graphs of transverse aberration in a condition equivalent to 0.5-degree lens shift with respect to the numerical embodiment 1 involving application of actual numerical values to the first embodiment, where graphs in FIG. 6 show transverse aberration at the wide-angle end position; those in FIG. 7 show transverse aberration at the intermediate focal length position; and those in FIG. 8 show transverse aberration at the telephoto end position.
Figure 7:
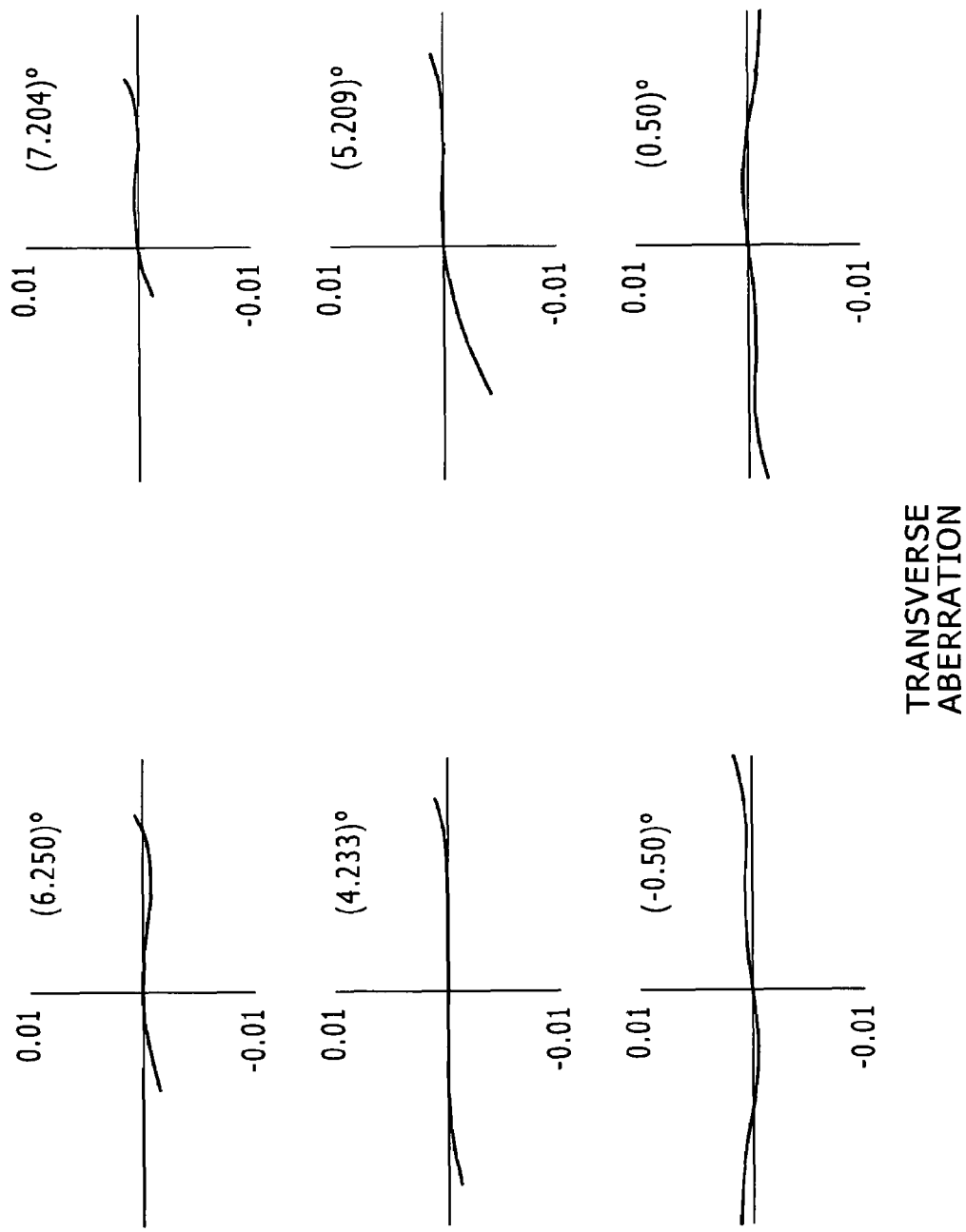
Figure 8:
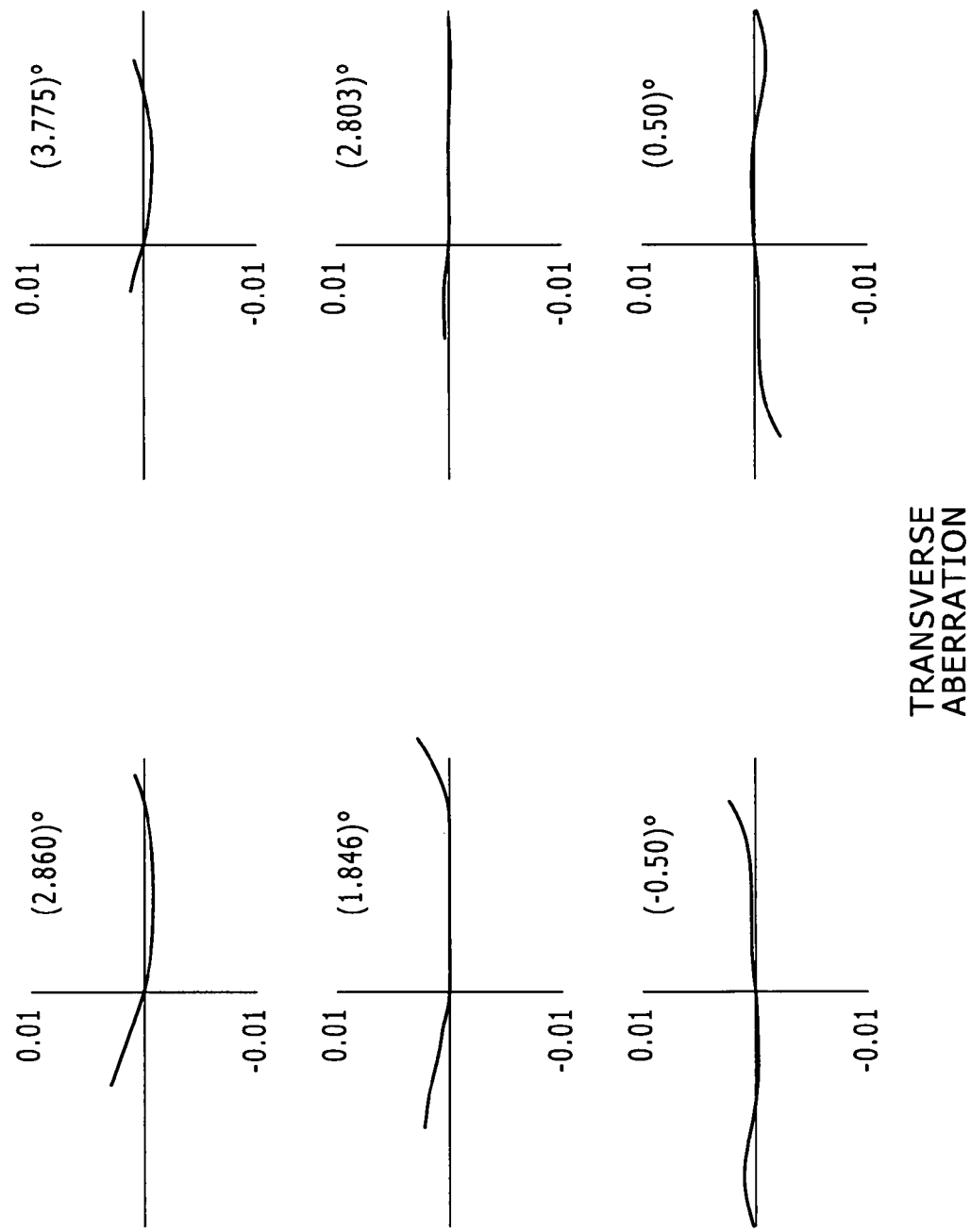

FIGS. 6 to 8 respectively illustrate graphs of transverse aberration in a condition equivalent to 0.5-degree lens shift with respect to the numerical embodiment 1 in the in-focus condition at infinity, where graphs in FIG. 6 show transverse aberration in the wide-angle end position (f=1.000), those in FIG. 7 show transverse aberration in the intermediate focal length position (f=4.525), and those in FIG. 8 show transverse aberration in the telephoto end position (f=9.05).

Referring to the various aberration graphs in FIGS. 3 to 8, the solid line in each spherical aberration graph indicates a spherical aberration, and the solid line and the broken line in each astigmatism graph respectively indicate a sagittal image plane and a meridional image plane. In the comatic aberration graphs, A indicates an angle of view, and y indicates an image height.

It is obviously seen from each aberration graph that the numerical embodiment 1 enables satisfactory correction of the various aberrations to be achieved, and provides excellent imaging performance.

Figure 9:
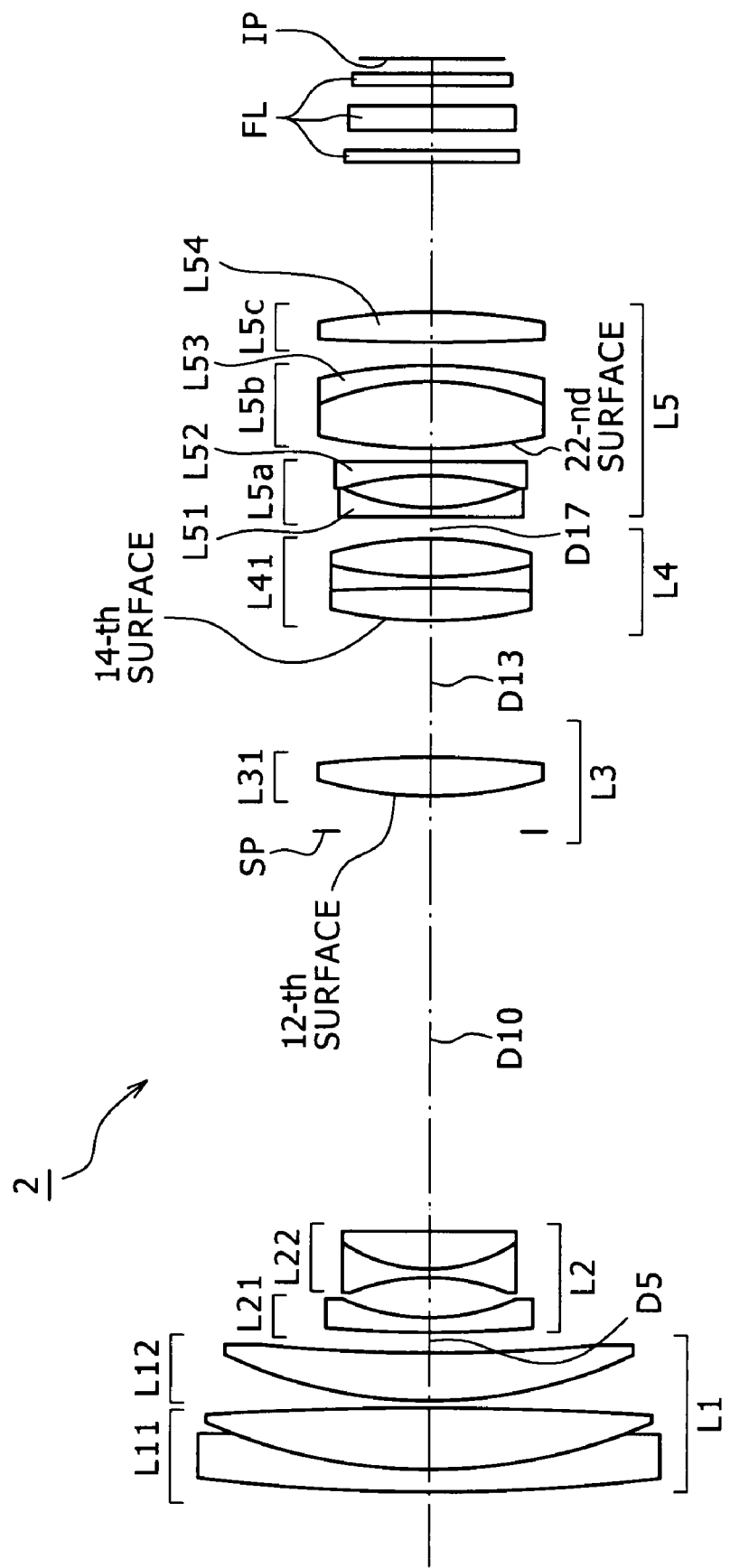
FIG. 9 shows a lens configuration with respect to a second embodiment of the zoom lens according to the present invention.

FIG. 9 shows a lens configuration of a zoom lens 2 according to a second embodiment of the present invention. A first lens group L1 is composed of, in the order of the object-to-image direction, a cemented lens L11 made up of a meniscus-shaped negative lens having a convex surface facing toward the object and a positive lens having a convex surface facing toward the object, and a positive lens L12 having a convex surface facing toward the object. A second lens group L2 is composed of, in the order of the object-to-image direction, a meniscus-shaped negative lens L21 having a concave surface facing toward the image, and a cemented lens L22 made up of a biconcave lens and a biconvex lens. A third lens group L3 is composed of a biconvex lens L31 whose object-side surface is of aspherical shape. A fourth lens group L4 is composed of a three-cemented lens L41 made up of, in the order of the object-to-image direction, a biconvex lens, a biconcave lens, and a biconvex lens and whose object-side surface is of aspherical shape. A fifth lens group L5 is made up of, in the order of the object-to-image direction, a fifth-a lens group L5a, a fifth-b lens group L5b, and a fifth-c lens group L5c. The fifth-a lens group L5a is composed of a meniscus-shaped negative lens L51 having a concave surface facing toward the image and a negative lens L52 having a concave surface facing toward the object. The fifth-b lens group L5b includes a cemented lens L53 made up of a convex lens whose object-side surface is of aspherical shape, and a meniscus-shaped negative lens having a concave surface facing toward the object. The fifth-c lens group L5c is composed of a biconvex lens L54. In addition, an aperture stop SP is located on the object side of the third lens group L3, and is fixed with respect to the optical axis direction during the zooming from the wide-angle end position to the telephoto end position. Further, a filter FL is placed between the fifth lens group L5 and an image plane IP. And, a shift of the image is made possible by shifting the fifth-b lens group L5b included in the fifth lens group L5 so as to have a perpendicular component with respect to the optical axis.

Lens data with respect to a numerical embodiment 2 involving application of the actual numerical values to the zoom lens 2 according to the second embodiment is listed in Table 5.

TABLE 5

| SURFACE NUMBER | RADIUS OF CURVATURE | SURFACE GAP | REFRACTIVE INDEX | ABBE NUMBER | |
|---|---|---|---|---|---|
| 1 | 11.80634 | 0.154236 | 1.84666 | 23.8 | |
| 2 | 4.00084 | 0.620355 | 1.49700 | 81.6 | |
| 3 | −21.42169 | 0.034275 | | | |
| 4 | 4.12881 | 0.470523 | 1.88300 | 40.8 | |
| 5 | 29.05648 | (D5) | | | |
| 6 | 29.05648 | 0.077118 | 1.88300 | 40.8 | |
| 7 | 1.86982 | 0.308472 | | | |
| 8 | −2.02268 | 0.077118 | 1.88300 | 40.8 | |
| 9 | 1.83873 | 0.248372 | 1.94595 | 18.0 | |
| 10 | ∞ | (D10) | | | |
| 11 | ∞ | 0.224499 | | | (APERTURE STOP) |
| 12 | 2.74786 | 0.338531 | 1.58313 | 59.5 | |
| 13 | −8.23034 | (D13) | | | |
| 14 | 4.43587 | 0.226933 | 1.69350 | 53.2 | |
| 15 | −148.10278 | 0.085687 | 1.80518 | 25.5 | |
| 16 | 2.92765 | 0.340279 | 1.62041 | 60.3 | |
| 17 | −2.92765 | (D17) | | | |
| 18 | 15.54080 | 0.085687 | 1.80420 | 46.5 | |
| 19 | 1.93642 | 0.268834 | | | |
| 20 | −3.17313 | 0.085687 | 1.69680 | 55.5 | |
| 21 | ∞ | 0.119961 | | | |
| 22 | 3.28811 | 0.521678 | 1.76802 | 49.2 | |
| 23 | −2.43795 | 0.119961 | 1.84666 | 23.8 | |
| 24 | −4.95573 | 0.171373 | | | |
| 25 | 5.40931 | 0.271353 | 1.69680 | 55.5 | |
| 26 | −10.87145 | 1.296543 | | | |
| 27 | ∞ | 0.073691 | 1.51680 | 64.2 | |
| 28 | ∞ | 0.171373 | | | |
| 29 | ∞ | 0.191938 | 1.55232 | 63.4 | |
| 30 | ∞ | 0.171373 | | | |
| 31 | ∞ | 0.085687 | 1.51680 | 64.2 | |
| 32 | ∞ | (Bf) | | | |

With respect to the zoom lens 2, the image-side surface (the twelfth surface) of the biconvex lens L31 included in the third lens group L3, the object-side surface (the fourteenth surface) of the three-cemented lens L41 included in the fourth lens group L4, and the object-side surface (the twenty-second surface) of the fifth-b lens group L5b included in the fifth lens group L5 are of aspherical shape. As such, the fourth-, the sixth-, the eighth- and the tenth-order aspherical coefficients A, B, C and D of the above surfaces with respect to the numerical embodiment 2 are listed in Table 6 together with their conic constants ($\kappa$).

TABLE 6

|  | $\kappa$ | A | B | C | D |
|---|---|---|---|---|---|
| 12$^{th}$ SURFACE | 0.000000 | −0.151972E−01 | −0.331100E−02 | 0.000000 | 0.000000 |
| 14$^{th}$ SURFACE | 0.000000 | −0.200864E−01 | 0.524170E−02 | −0.643987E−02 | 0.392173E−02 |
| 22$^{nd}$ SURFACE | 0.000000 | −0.124986E−01 | 0.315251E−02 | −0.115177E−02 | 0.000000 |

With respect to the zoom lens 2, when zooming from the wide-angle end position to the telephoto end position, a surface gap D5 between the first lens group L1 and the second lens group L2, a surface gap D10 between the second lens group L2 and the third lens group L3 (or the aperture stop SP), a surface gap D13 between the third lens group L3 and the fourth lens group L4, and a surface gap D17 between the fourth lens group L4 and the fifth lens group L5 are supposed to undergo changes. As such, values for each of the above surface gaps with respect to the numerical embodiment 2 in the wide-angle end position (f=1.00), the intermediate focal length position (f=4.55), and the telephoto end position (f=9.09) are listed in Table 7 together with focal lengths f, F-numbers FNO and angles of view 2$\omega$.

TABLE 7

| f | 1.00 | 4.55 | 9.09 |
|---|---|---|---|
| FNO | 1.89 | 2.44 | 2.91 |
| 2$\omega$ | 62.05 | 13.97 | 6.87° |
| D5 | 0.163 | 2.383 | 3.183 |
| D10 | 3.231 | 1.011 | 0.211 |
| D13 | 1.068 | 0.329 | 0.945 |
| D17 | 0.121 | 0.860 | 0.243 |
| Bf | 0.137 | 0.137 | 0.137 |

Corresponding values to the above conditional inequalities of (1) to (6) with respect to the numerical embodiment 2 are listed in Table 8.

[Table 8]

$$f5c/f5a = -3.1494 \quad (1)$$

$$f5b/ft = 0.3275 \quad (2)$$

$$f5/|f5a| = 5.5112 \quad (3)$$

$$f5/f5c = 1.6263 \quad (4)$$

$$f5/(fw \cdot ft)^{1/2} = 2.8026 \quad (5)$$

$$f5b/(fw \cdot ft)^{1/2} = 0.9179 \quad (6)$$

Figure 10:
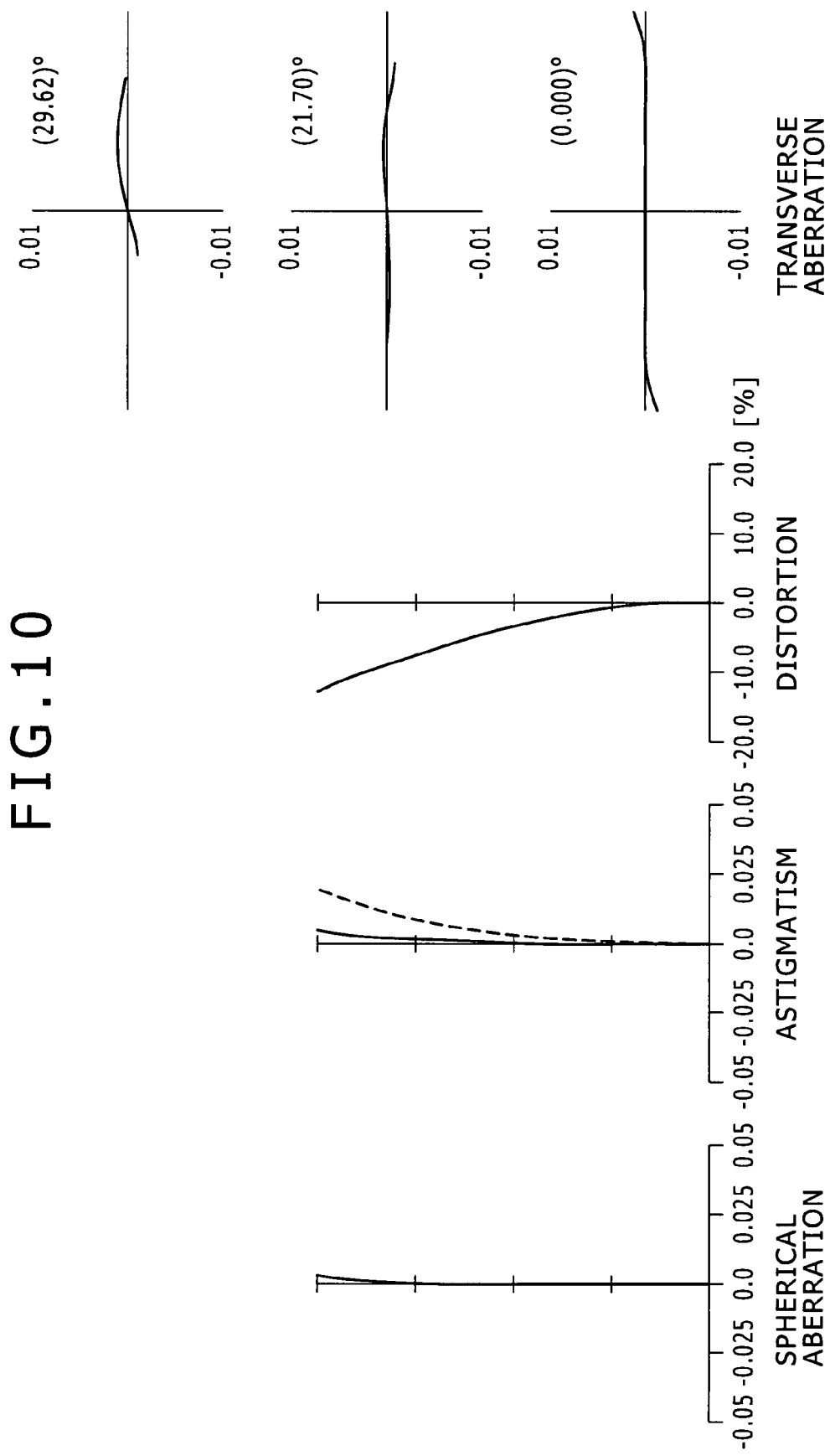
FIGS. 10 to 12 respectively illustrate graphs of various aberrations with respect to a numerical embodiment 2 involving application of actual numerical values to the second embodiment, where graphs in FIG. 10 show spherical aberration, astigmatism, distortion, and transverse aberration at a wide-angle end position; those in FIG. 11 show spherical aberration, astigmatism, distortion, and transverse aberration at an intermediate focal length position; and those in FIG. 12 show spherical aberration, astigmatism, distortion, and transverse aberration at a telephoto end position.
Figure 11:
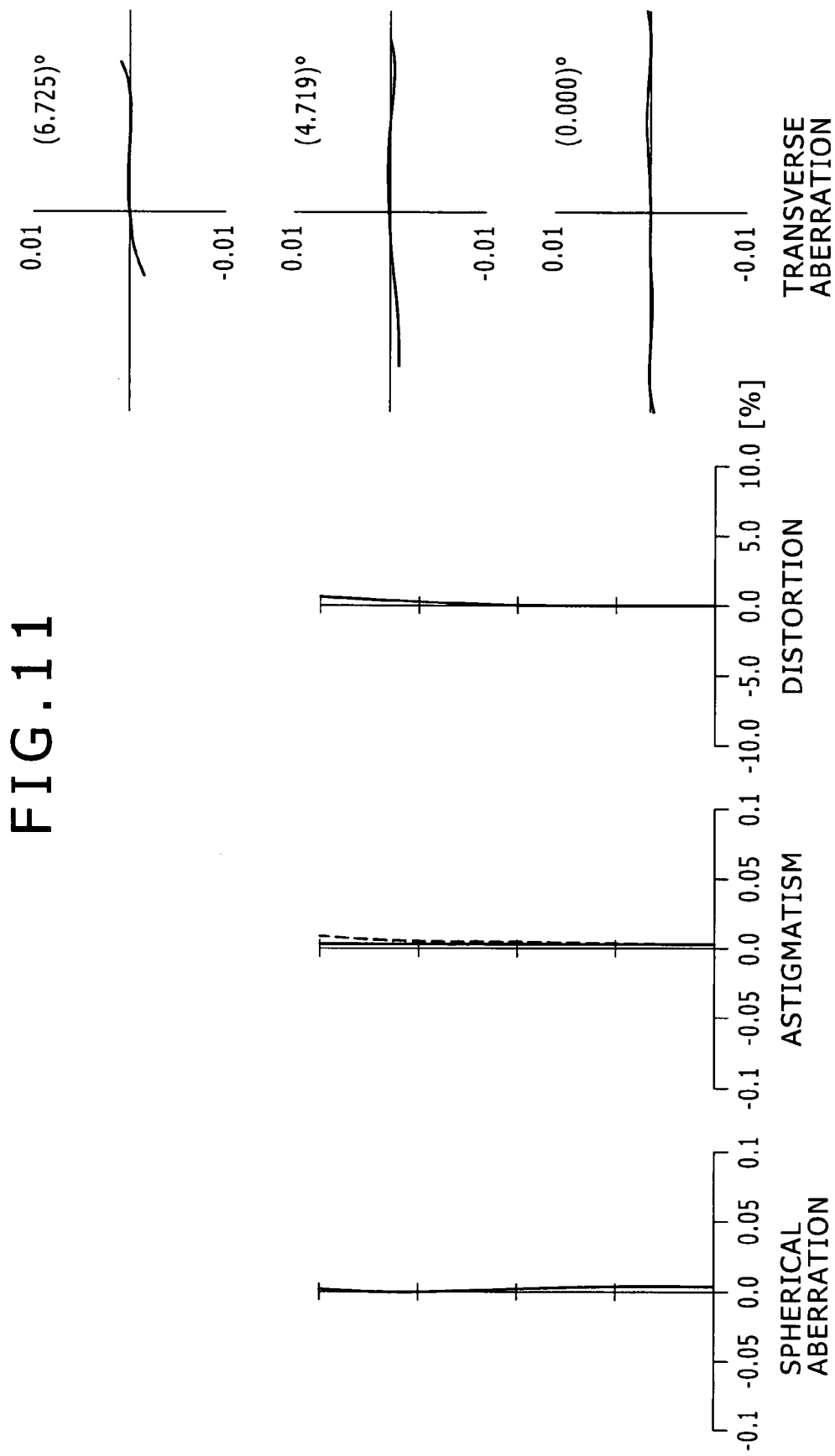
Figure 12:
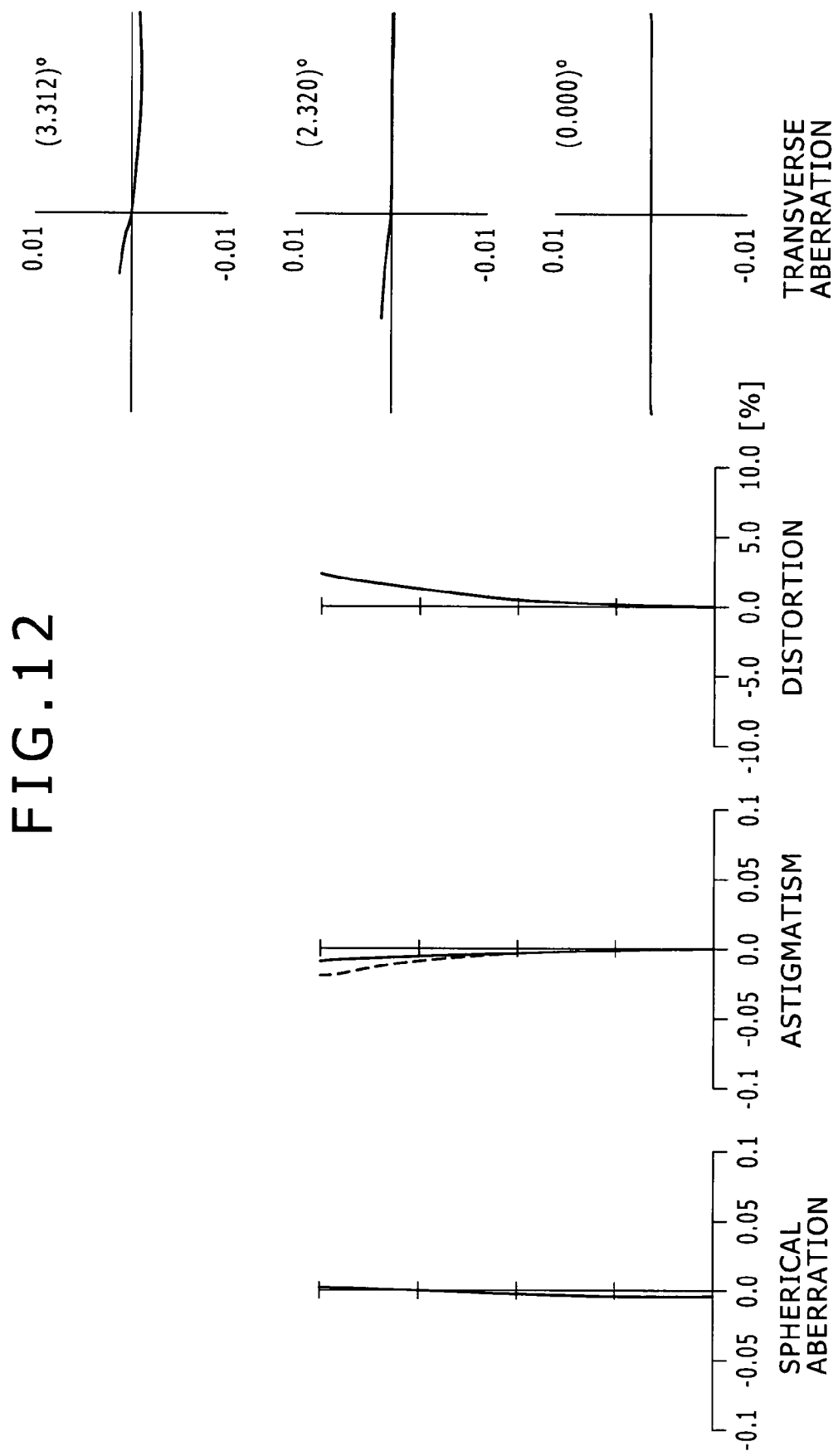

FIGS. 10 to 12 respectively illustrate graphs of various aberrations with respect to the numerical embodiment 2 in an in-focus condition at infinity, where graphs in FIG. 10 show various aberrations in the wide-angle end position (f=1.00), those in FIG. 11 show various aberrations in the intermediate focal length position (f=4.55), and those in FIG. 12 show various aberrations in the telephoto end position (f=9.09).

Figure 13:
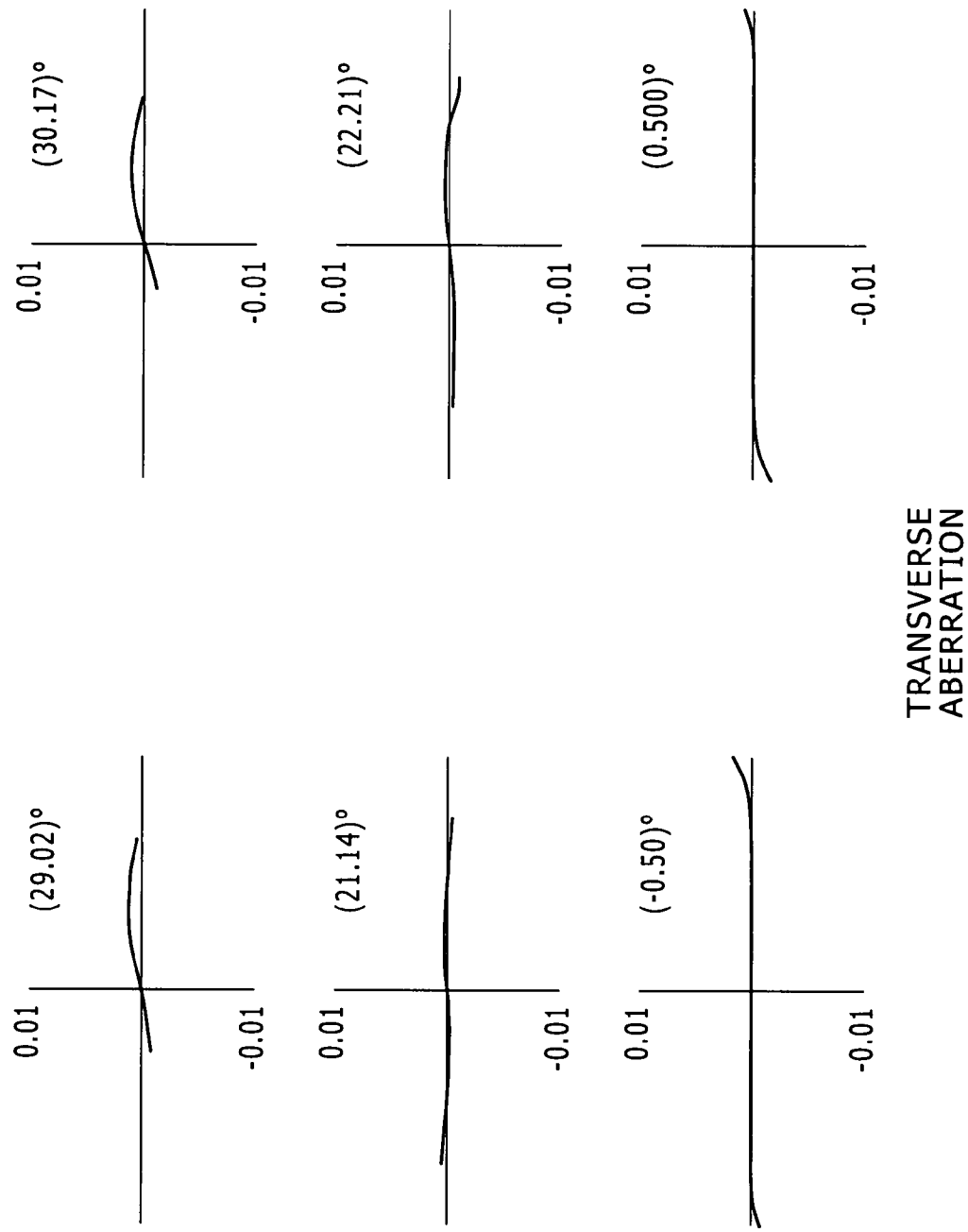
FIGS. 13 to 15 respectively illustrate graphs of transverse aberration in a condition equivalent to 0.5-degree lens shift with respect to the numerical embodiment 2 involving application of actual numerical values to the second embodiment, where graphs in FIG. 13 show transverse aberration at the wide-angle end position; those in FIG. 14 show transverse aberration at the intermediate focal length position; and those in FIG. 15 show transverse aberration at the telephoto end position.
Figure 14:
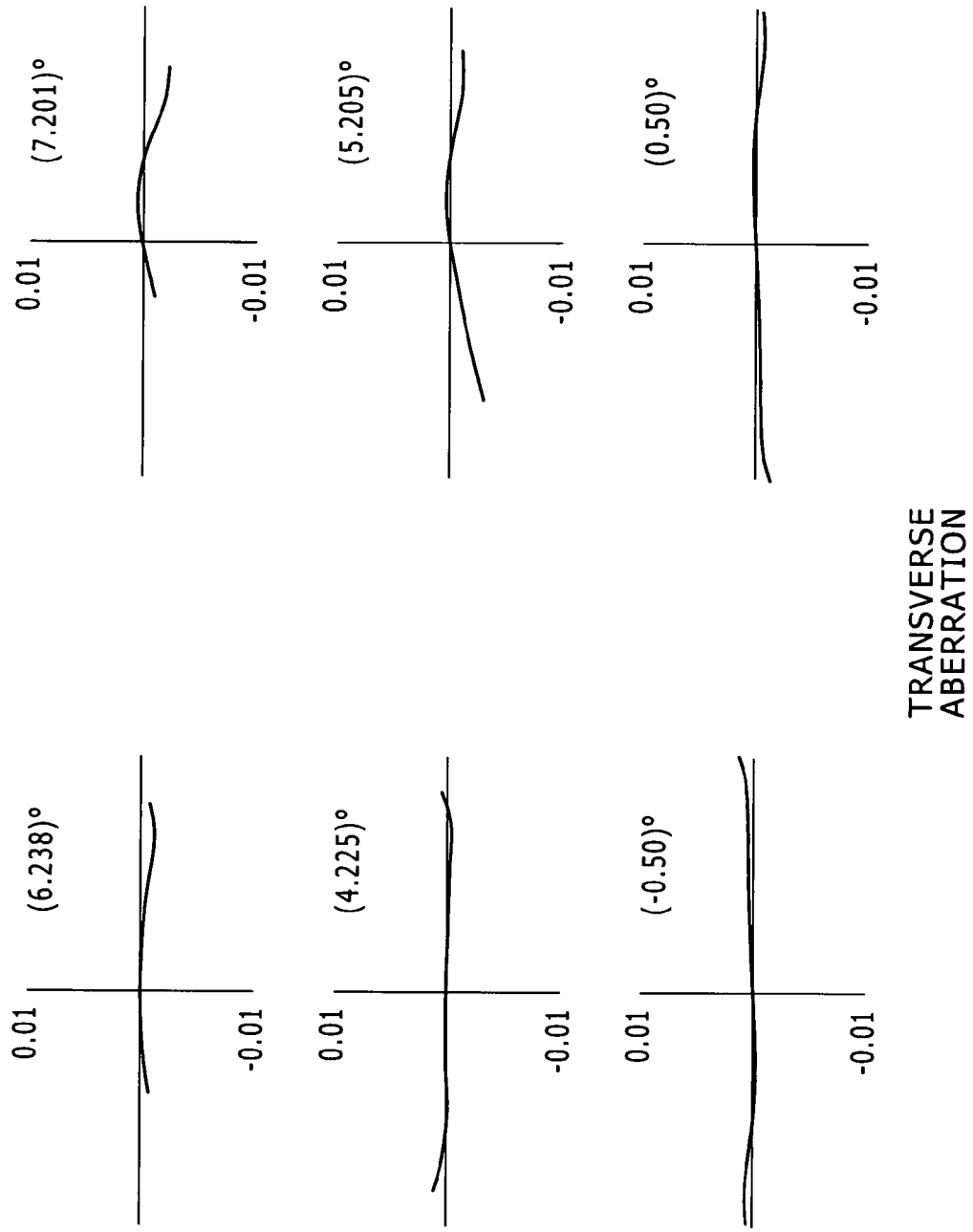
Figure 15:
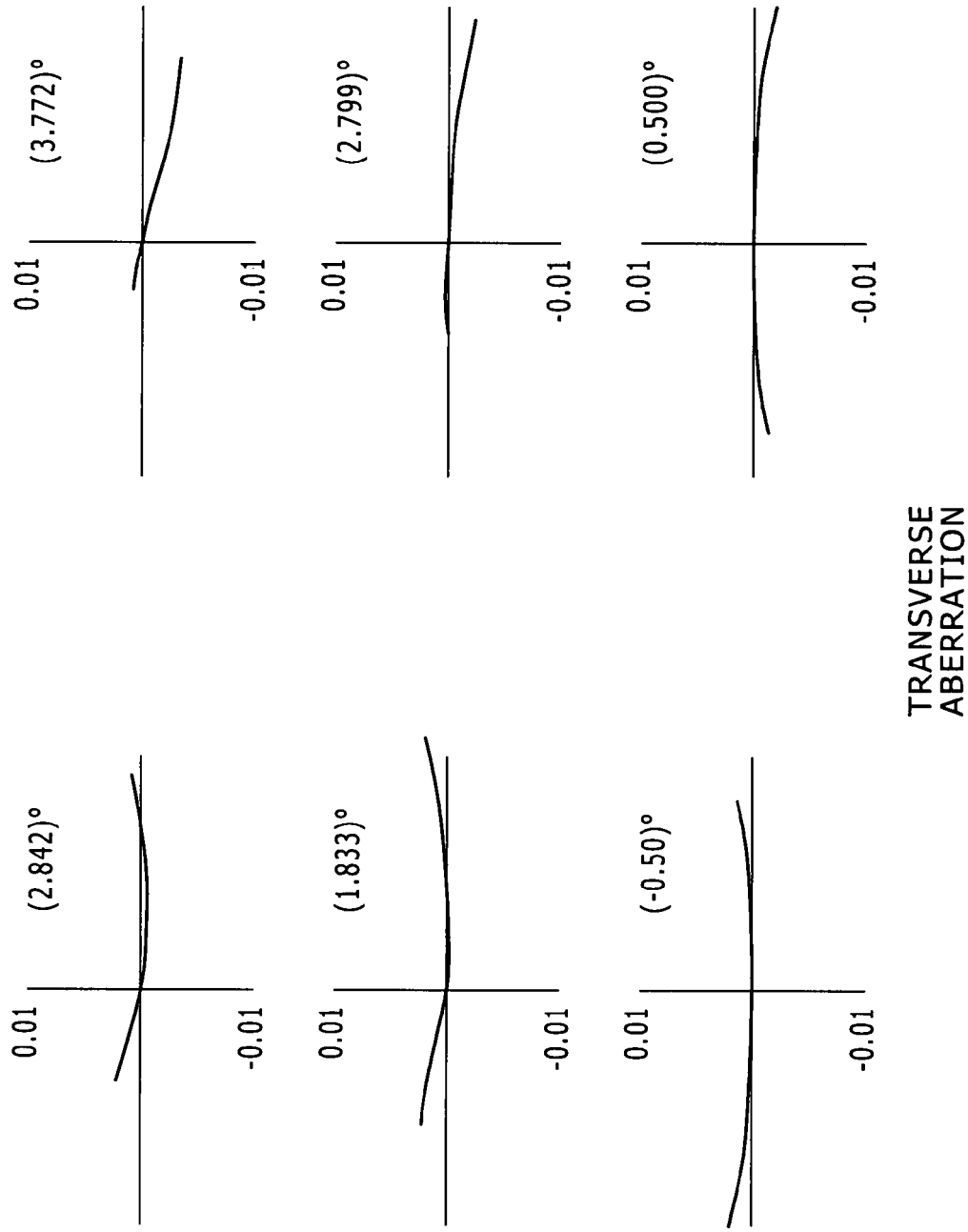

FIGS. 13 to 15 respectively illustrate graphs of transverse aberration in a condition equivalent to 0.5-degree lens shift with respect to the numerical embodiment 2 in the in-focus condition at infinity, where graphs in FIG. 13 show transverse aberration in the wide-angle end position (f=1.00), those in FIG. 14 show transverse aberration in the intermediate focal length position (f=4.55), and those in FIG. 15 show transverse aberration in the telephoto end position (f=9.09).

Referring to the various aberration graphs in FIGS. 10 to 15, a solid line in each spherical aberration graph indicates a spherical aberration, and a solid line and a broken line in each astigmatism graph respectively indicate a sagittal image plane and a meridional image plane. In the comatic aberration graphs, A indicates an angle of view, and y indicates an image height.

It is obviously seen from each aberration graph that the numerical embodiment 2 enables satisfactory correction of the various aberrations to be achieved, and provides excellent imaging performance.

Figure 16:
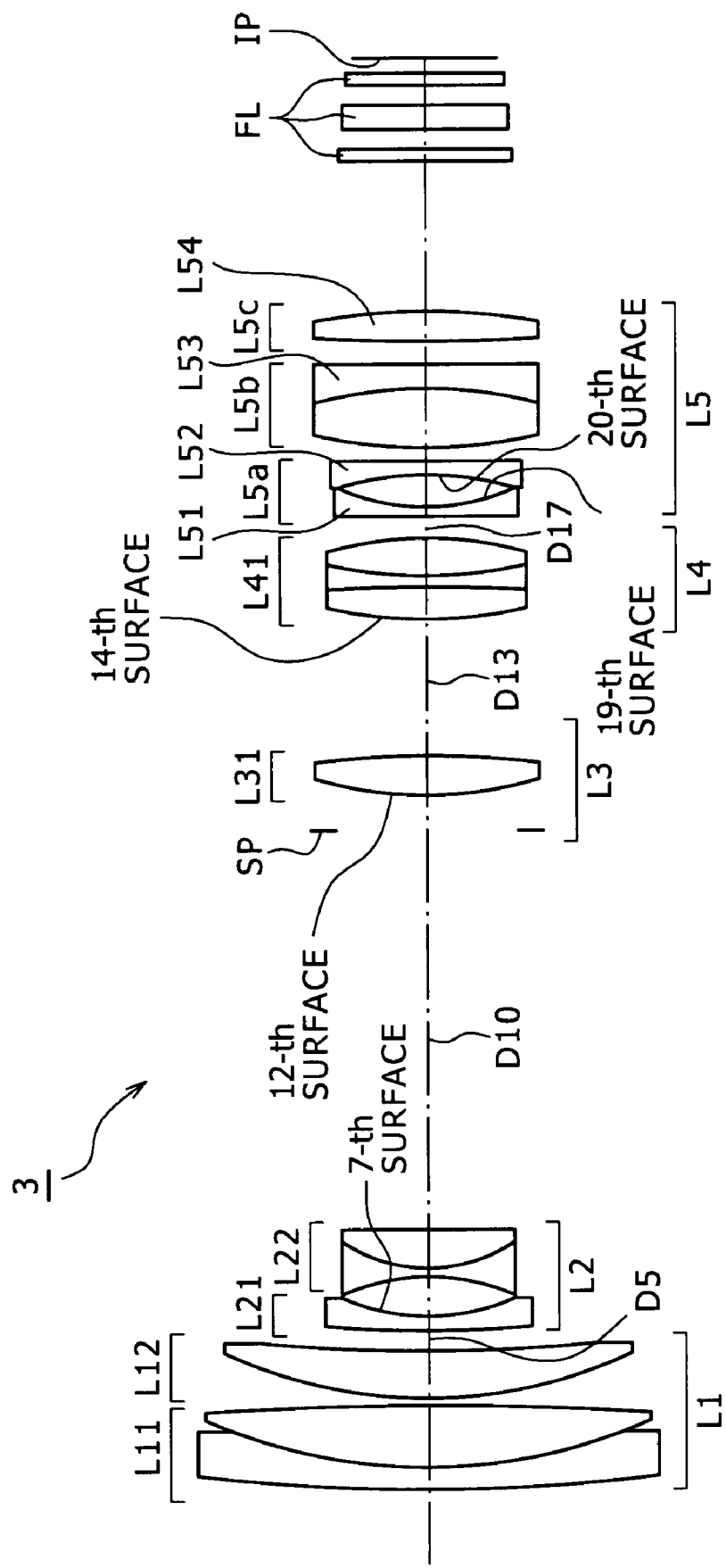
FIG. 16 shows a lens configuration with respect to a third embodiment of the zoom lens according to the present invention.

FIG. 16 shows a lens configuration of a zoom lens 3 according to a third embodiment of the present invention. A first lens group L1 is composed of, in the order of the object-to-image direction, a cemented lens L11 made up of a meniscus-shaped negative lens having a convex surface facing toward the object and a positive lens having a convex surface facing toward the object, and a positive lens L12 having a convex surface facing toward the object. A second lens group L2 is composed of, in the order of the object-to-image direction, a meniscus-shaped negative lens L21 having a concave surface facing toward the image and whose image-side surface is of aspherical shape, and a cemented lens L22 made up of a biconcave lens and a biconvex lens. A third lens group L3 is composed of a biconvex lens L31 whose object-side surface of aspherical shape. A fourth lens group L4 is composed of a three-cemented lens L41 made up of, in the order of the object-to-image direction, a biconvex lens, a biconcave lens and a biconvex lens and whose object-side surface is of aspherical shape. A fifth lens group L5 includes, in the order of the object-to-image direction, a fifth-a lens group L5a, a fifth-b lens group L5b, and a fifth-c lens group L5c. The fifth-a lens group L5a is composed of a meniscus-shaped negative lens L51 having a concave surface facing toward the image and whose image side-surface is of aspherical shape, and a negative lens L52 having a concave surface facing toward the object and whose object-side surface is of aspherical shape. The fifth-b lens group L5b is composed of a cemented lens L53 made up of a biconvex lens and a meniscus-shaped negative lens having a concave surface facing toward the object. The fifth-c lens group L5c is composed of a biconvex lens L54. In addition, an aperture stop SP is located on the object side of the third lens group L3, and is fixed with respect to the optical axis direction during the zooming from the wide-angle end position to the telephoto end position. Further, a filter FL is placed between the fifth lens group L5 and an image plane IP. And, a shift of the image is provided by shifting the fifth-b lens L5b group included in the fifth lens group L5 so as to have a perpendicular component with respect to the optical axis.

negative lens L52 of the fifth-a lens group L5a included in the fifth lens group L5 are of aspherical shape. As such, the fourth-, the sixth-, the eighth-, and the tenth-order aspherical coefficients A, B, C, and D of the above surfaces with respect to the numerical embodiment 3 are listed in Table 10 together with their conic constants ($\kappa$).

TABLE 10

| | $\kappa$ | A | B | C | D |
|---|---|---|---|---|---|
| 7$^{th}$ SURFACE | 0.000000 | −0.520090E−04 | 0.543758E−05 | −0.217390E−06 | −0.463306E−09 |
| 12$^{th}$ SURFACE | 0.000000 | −0.107713E−03 | −0.178141E−06 | 0.000000 | 0.000000 |
| 14$^{th}$ SURFACE | 0.000000 | −0.807252E−04 | 0.154656E−06 | −0.111480E−08 | −0.129661E−09 |
| 19$^{th}$ SURFACE | 0.000000 | −0.28579E−03 | −0.196925E−05 | −0.370421E−07 | 0.113335E−08 |
| 20 SURFACE | 0.000000 | −0.730797E−04 | −0.789960E−06 | 0.375658E−08 | 0.000000 |

Lens data with respect to a numerical embodiment 3 involving application of the actual numerical values to the zoom lens 3 according to the third embodiment is listed in Table 9.

TABLE 9

| SURFACE NUMBER | RADIUS OF CURVATURE | SURFACE GAP | REFRACTIVE INDEX | ABBE NUMBER |
|---|---|---|---|---|
| 1 | 17.56967 | 0.155212 | 1.84666 | 23.8 |
| 2 | 4.26910 | 0.597067 | 1.61800 | 63.4 |
| 3 | −20.60337 | 0.034492 | | |
| 4 | 4.06527 | 0.386065 | 1.88300 | 40.8 |
| 5 | 17.23559 | 0.163835 | | |
| 6 | 17.98311 | 0.103475 | 1.85135 | 40.1 |
| 7 | 1.62664 | 0.337984 | | |
| 8 | −1.76073 | 0.078486 | 1.88300 | 40.8 |
| 9 | 2.64463 | 0.269673 | 1.94595 | 18.0 |
| 10 | −8.36910 | 3.263564 | | |
| 11 | ∞ | 0.241441 | | |
| 12 | 2.42876 | 0.413382 | 1.58313 | 59.5 |
| 13 | −5.59359 | 1.068317 | | |
| 14 | 5.66930 | 0.183651 | 1.69350 | 53.2 |
| 15 | −32.07869 | 0.086229 | 1.80518 | 25.5 |
| 16 | 3.51371 | 0.301112 | 1.62041 | 60.3 |
| 17 | −3.51371 | 0.150807 | | |
| 18 | −8.75597 | 0.100026 | 1.80610 | 40.7 |
| 19 | 1.54873 | 0.216107 | | |
| 20 | 2.13620 | 0.535500 | 1.80139 | 45.5 |
| 21 | −3.74785 | 0.235802 | 1.84666 | 23.8 |
| 22 | −29.14198 | 0.172458 | | |
| 23 | 10.50680 | 0.258463 | 1.69680 | 55.5 |
| 24 | −4.61524 | 0.969301 | | |
| 25 | ∞ | 0.074157 | 1.51680 | 64.2 |
| 26 | ∞ | 0.172458 | | |
| 27 | ∞ | 0.193153 | 1.55232 | 63.4 |
| 28 | ∞ | 0.172458 | | |
| 29 | ∞ | 0.086229 | 1.51680 | 64.2 |
| 30 | ∞ | 0.125894 | | |

With respect to the zoom lens 3, the image-side surface (the seventh surface) of the meniscus-shaped negative lens L21 included in the second lens group L2, the object-side surface (the twelfth surface) of the biconvex lens L31 included in the third lens group L3, the object-side surface (the fourteenth surface) of the three-cemented lens L41 included in the fourth lens group L4, the image-side surface (the nineteenth surface) of the meniscus-shaped negative lens L51 of the fifth-a lens group L5a included in the fifth lens group L5, and the object-side surface (the twentieth surface) of the meniscus-shaped With respect to the zoom lens 3, when zooming from the wide-angle end position to the telephoto end position, a surface gap D5 between the first lens group L1 and the second lens group L2, a surface gap D10 between the second lens group L2 and the third lens group L3 (or the aperture stop SP), a surface gap D13 between the third lens group L3 and the fourth lens group L4, and a surface gap D17 between the fourth lens group L4 and the fifth lens group L5 are supposed to undergo changes. As such, values for each of the above surface gaps with respect to the numerical embodiment 3 in the wide-angle end position (f=1.00), the intermediate focal length position (f=4.50), and the telephoto end position (f=9.02) are listed in Table 11 together with focal lengths f, F-numbers FNO and angles of view 2$\omega$.

TABLE 11

| f | 1.00 | 4.50 | 9.02 |
|---|---|---|---|
| FNO | 1.85 | 2.27 | 2.86 |
| 2$\omega$ | 62.25 | 14.16 | 6.94° |
| D5 | 0.164 | 2.440 | 3.215 |
| D10 | 9.932 | 2.150 | 0.812 |
| D13 | 1.068 | 0.309 | 1.060 |
| D17 | 0.151 | 0.910 | 0.159 |
| Bf | 0.126 | 0.126 | 0.126 |

Corresponding values to the above conditional inequalities of (1) to (6) with respect to the numerical embodiment 3 are listed in Table 12.

[Table 12]

$$f5c/f5a = -2.8556 \qquad (1)$$

$$f5b/ft = 0.2403 \qquad (2)$$

$$f5/|f5a| = 5.6601 \qquad (3)$$

$$f5/f5c = 2.2399 \qquad (4)$$

$$f5/(fw \cdot ft)^{1/2} = 3.4938 \qquad (5)$$

$$f5b/(fw \cdot ft)^{1/2} = 0.8396 \qquad (6)$$

Figure 17:
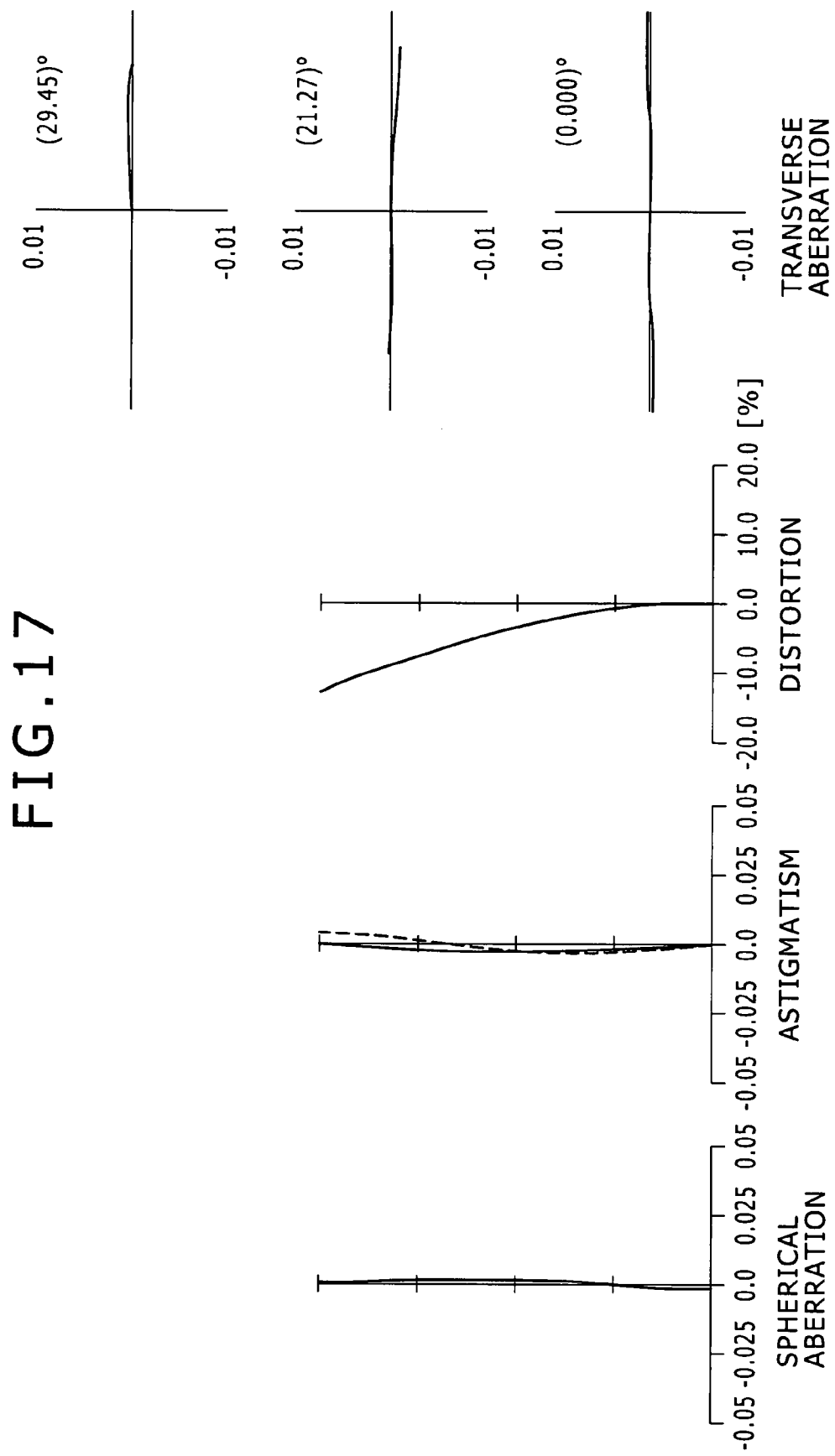
FIGS. 17 to 19 respectively illustrate graphs of various aberrations with respect to a numerical embodiment 3 involving application of actual numerical values to the third embodiment, where graphs in FIG. 17 show spherical aberration, astigmatism, distortion, and transverse aberration at a wide-angle end position; those in FIG. 18 show spherical aberration, astigmatism, distortion, and transverse aberration at an intermediate focal length position; and those in FIG. 19 show spherical aberration, astigmatism, distortion, and transverse aberration at a telephoto end position.
Figure 18:
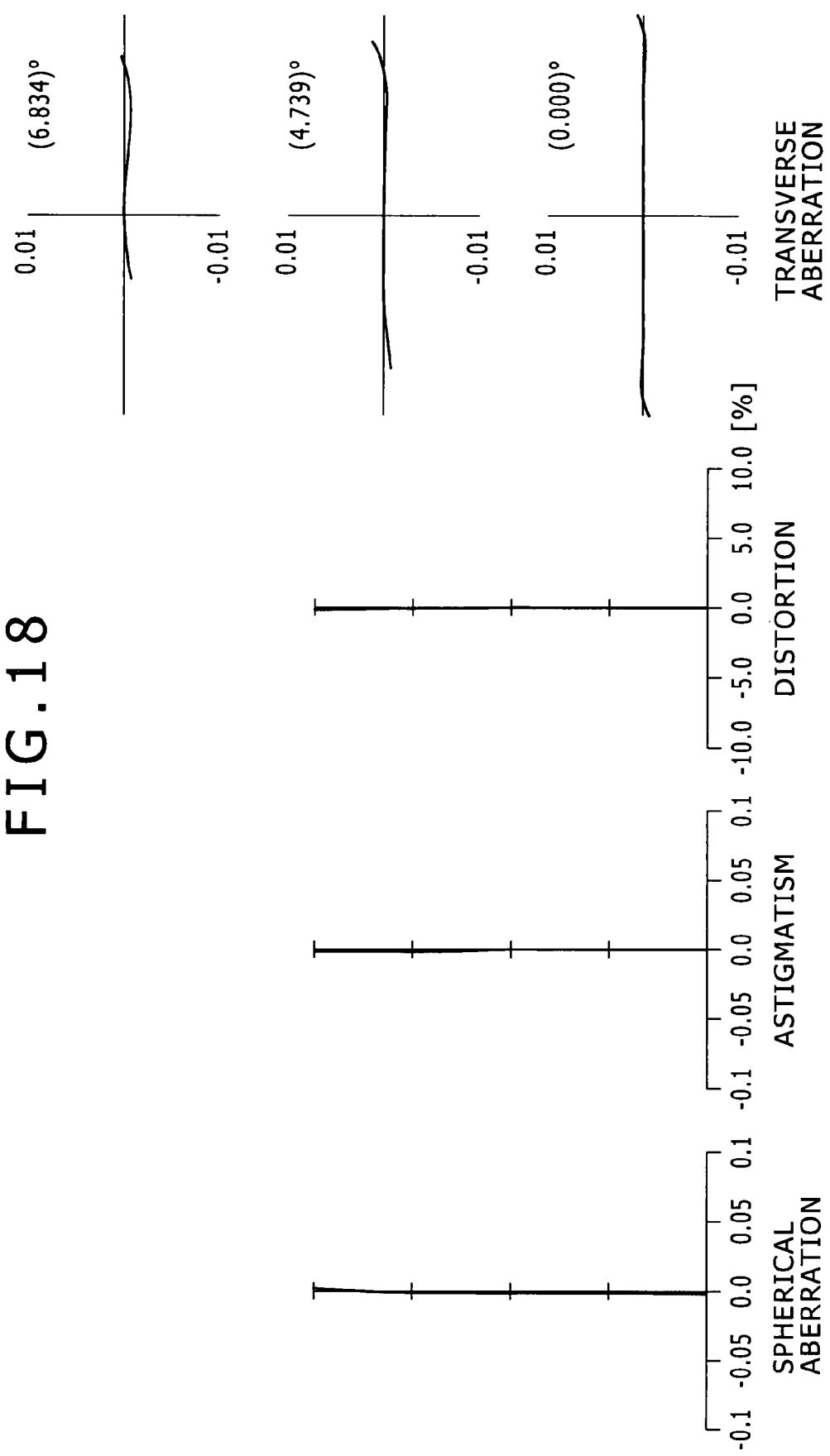
Figure 19:
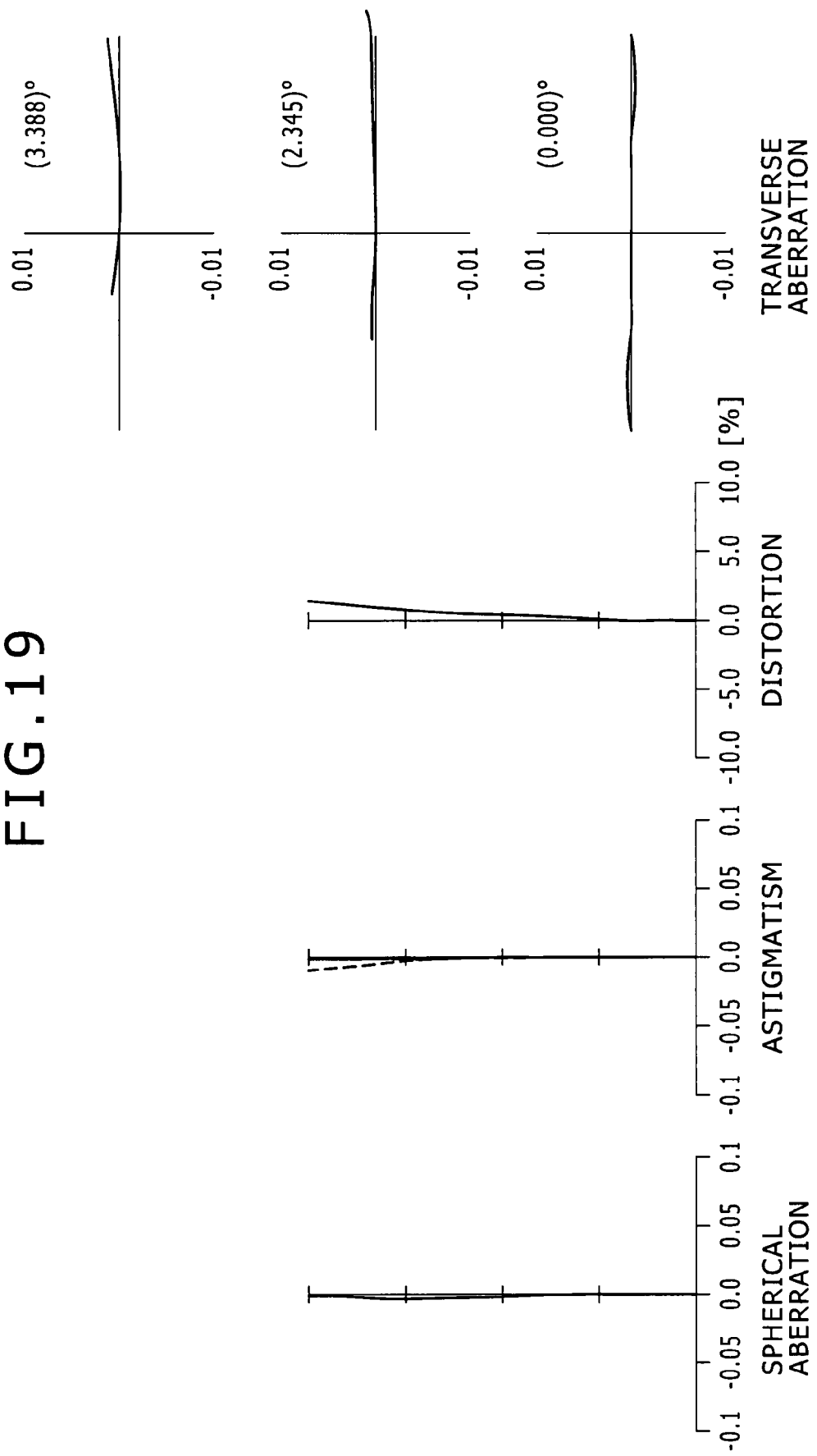

FIGS. 17 to 19 respectively illustrate graphs of various aberrations with respect to the numerical embodiment 3 in an in-focus condition at infinity, where graphs in FIG. 17 show various aberrations in the wide-angle end position (f=1.00), those in FIG. 18 show various aberrations in the intermediate focal length position (f=4.50), and those in FIG. 19 show various aberrations in the telephoto end position (f=9.017).

Figure 20:
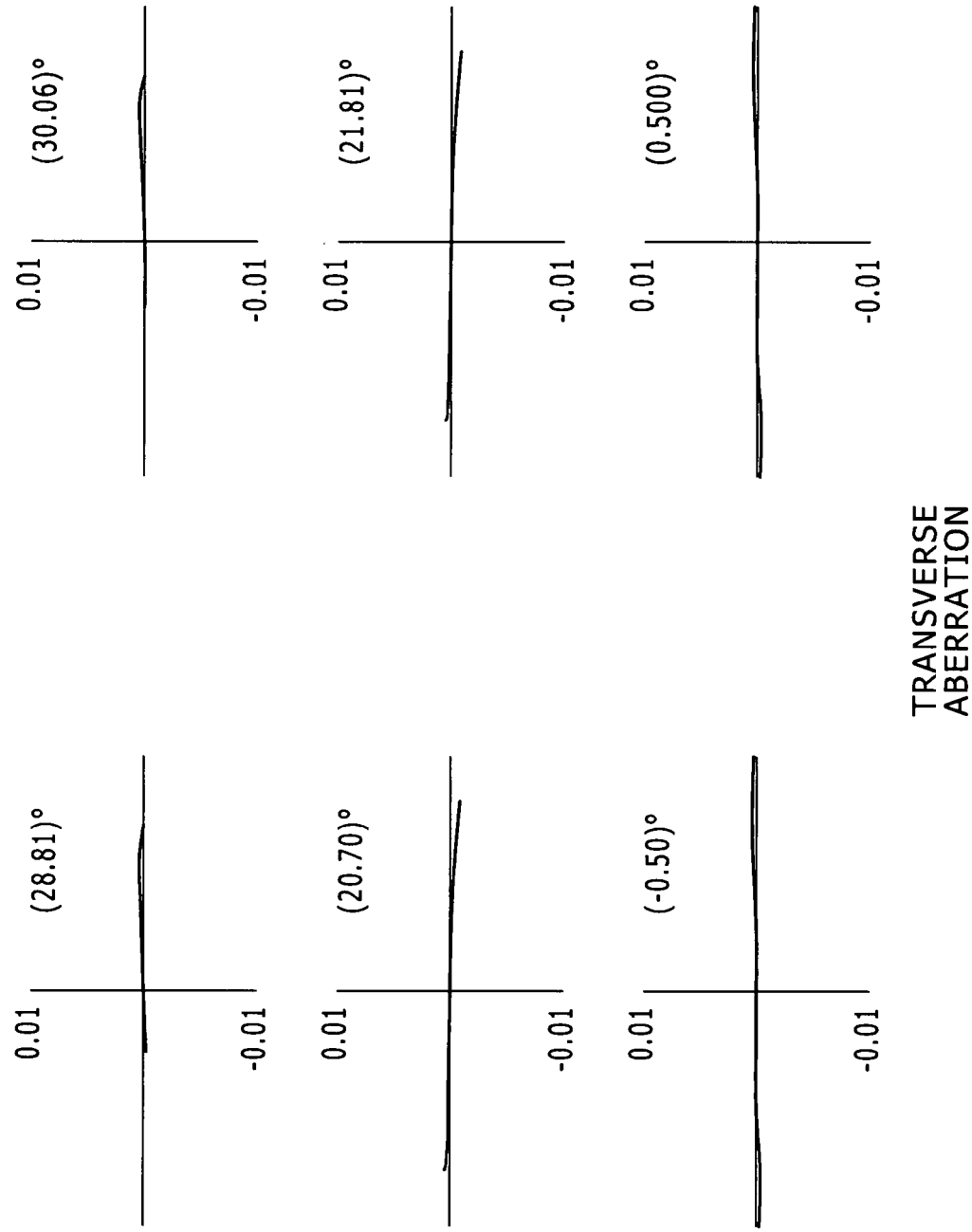
FIGS. 20 to 22 respectively illustrate graphs of transverse aberration in a condition equivalent to 0.5-degree lens shift with respect to the numerical embodiment 3 involving application of actual numerical values to the third embodiment, where graphs in FIG. 20 show transverse aberration at the wide-angle end position; those in FIG. 21 show transverse aberration at the intermediate length position; and those in FIG. 22 show transverse aberration at the telephoto end position.
Figure 21:
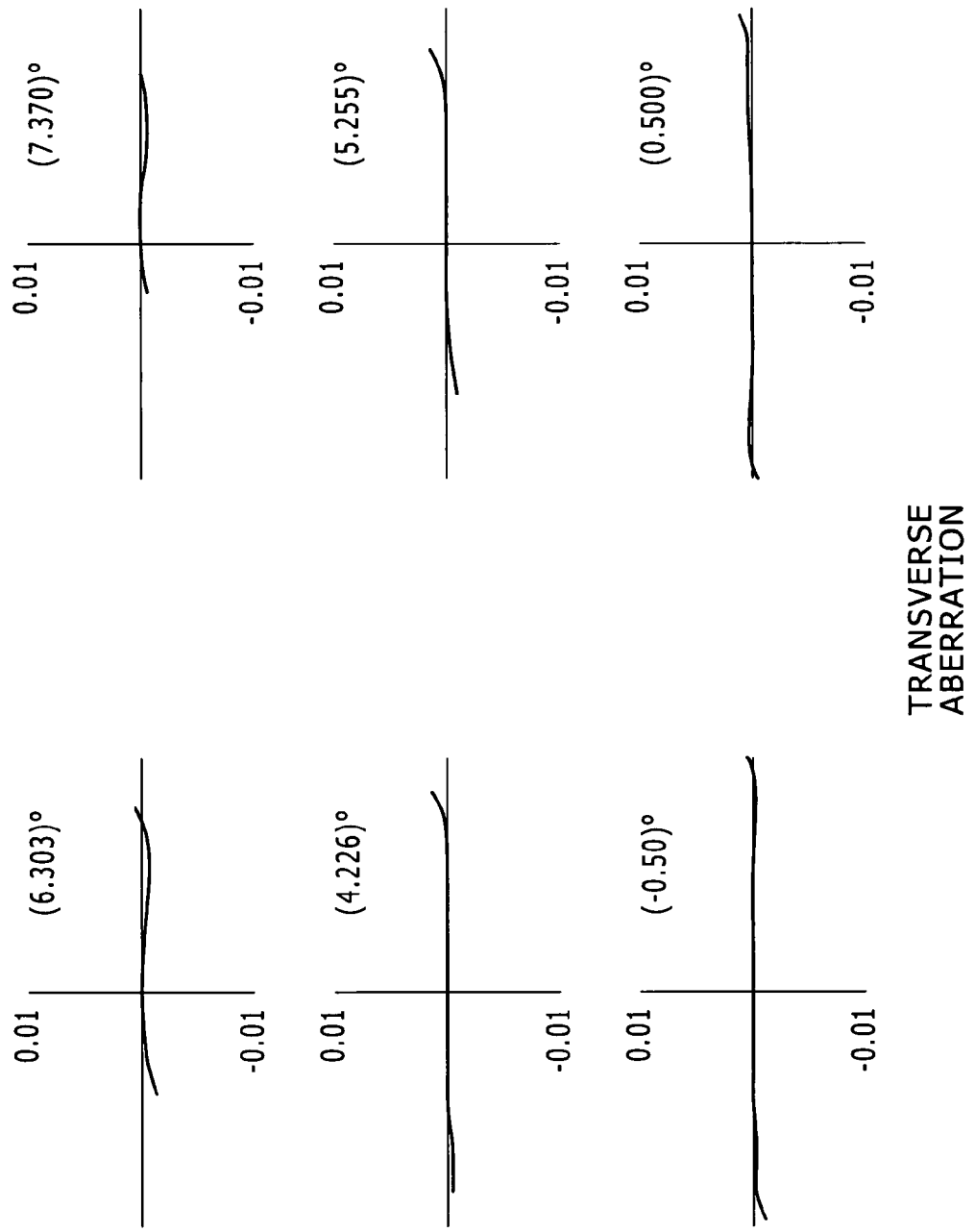
Figure 22:
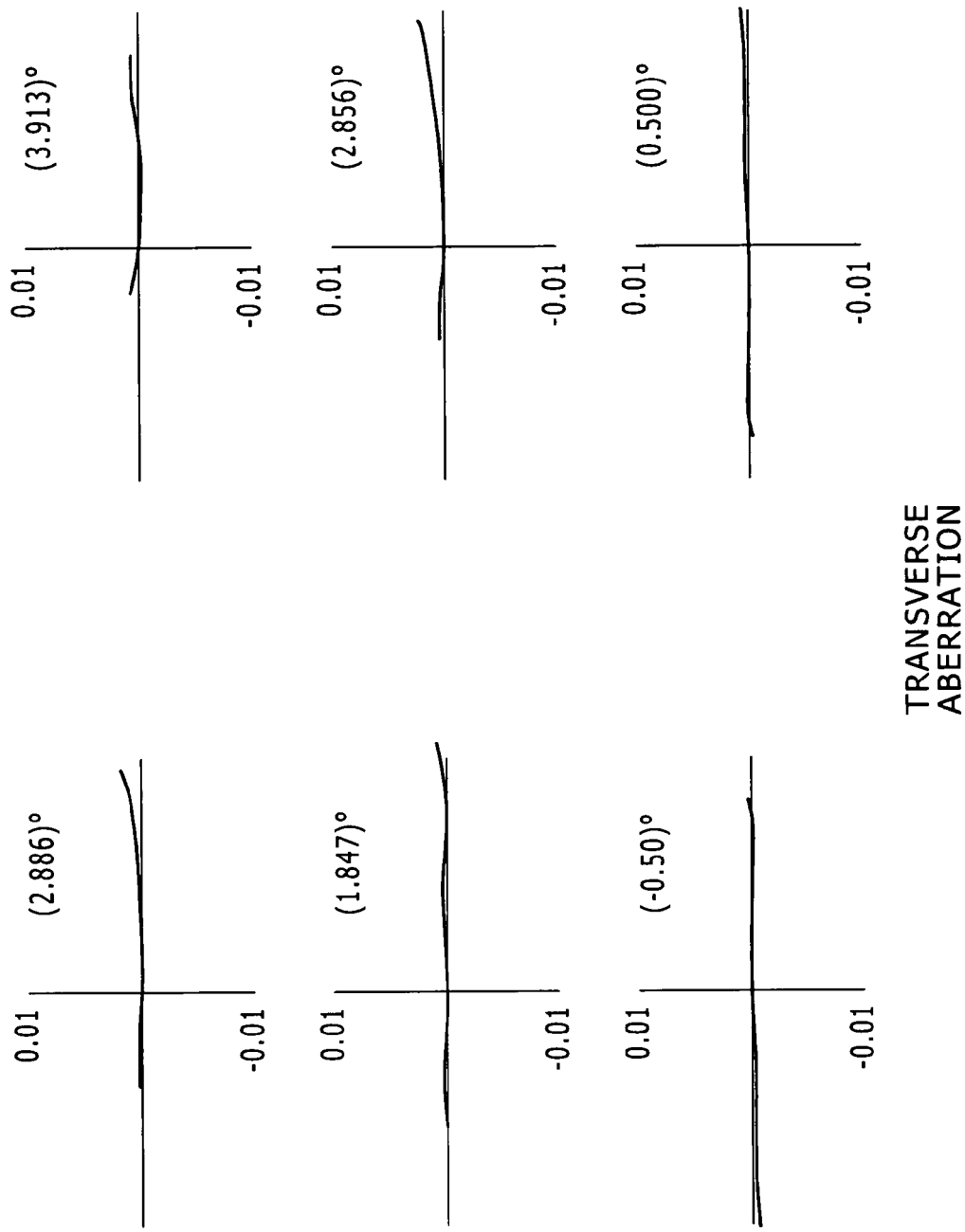

FIGS. 20 to 22 respectively illustrate graphs of transverse aberration in a condition equivalent to 0.5-degree lens shift with respect to the numerical embodiment 3 in the in-focus condition at infinity, where graphs in FIG. 20 show transverse aberration in the wide-angle end position (f=1.00), those in FIG. 21 show transverse aberration in the intermediate focal length position (f=4.50), and those in FIG. 22 show transverse aberration in the telephoto end position (f=9.017).

Referring to the various aberration graphs in FIGS. 17 to 22, a solid line in each spherical aberration graph indicates a spherical aberration, and a solid line and a broken line in each astigmatism graph respectively indicate a sagittal image plane and a meridional image plane. In the comatic aberration graphs, A indicates an angle of view, and y indicates an image height.

It is obviously seen from each aberration graph that the numerical embodiment 3 enables satisfactory correction of the various aberrations to be achieved, and provides excellent imaging performance.

An imaging apparatus of the present invention is now described.

The imaging apparatus of the present invention is a type having a zoom lens and an image sensor for converting an optical image formed by the above zoom lens into electric signals. The above zoom lens includes, in an order of an object-to-image direction, a first lens group, a second lens group, a third lens group, a fourth lens group, and a fifth lens group. The first lens group has a positive refractive power and is fixed with respect to an image plane. The second lens group has a negative refractive power and is for zooming by moving on an optical axis. The third lens group has a positive refractive power and is fixed with respect to an optical axis direction. The fourth lens group has a positive refractive power and is for correcting fluctuations in imaging position by moving on the optical axis, as well as for correcting an imaging position change associated with a change in object distance. The fifth lens group has a positive refractive power and is fixed with respect to the optical axis direction. The fifth lens group is composed of, in the order of the object-to-image direction, a fifth-a lens group having a negative refractive power, a fifth-b lens group having a positive refractive power and a fifth-c lens group having a positive refractive power. The fifth-a lens group is composed of, in the order of the object-to-image direction, two negative lenses which are of a negative lens having a powerful concave surface facing toward an image and a negative lens having a powerful concave surface facing toward an object. A shift of the image is made possible by shifting the fifth-b lens group so as to have a perpendicular component with respect to the optical axis, and a conditional expression (1) shown below is satisfied:

$$-4.0 < f5c/f5a < -1.5 \quad (1)$$

where f5a is a focal length of the fifth-a lens group, and f5c is a focal length of the fifth-c lens group.

Figure 23:
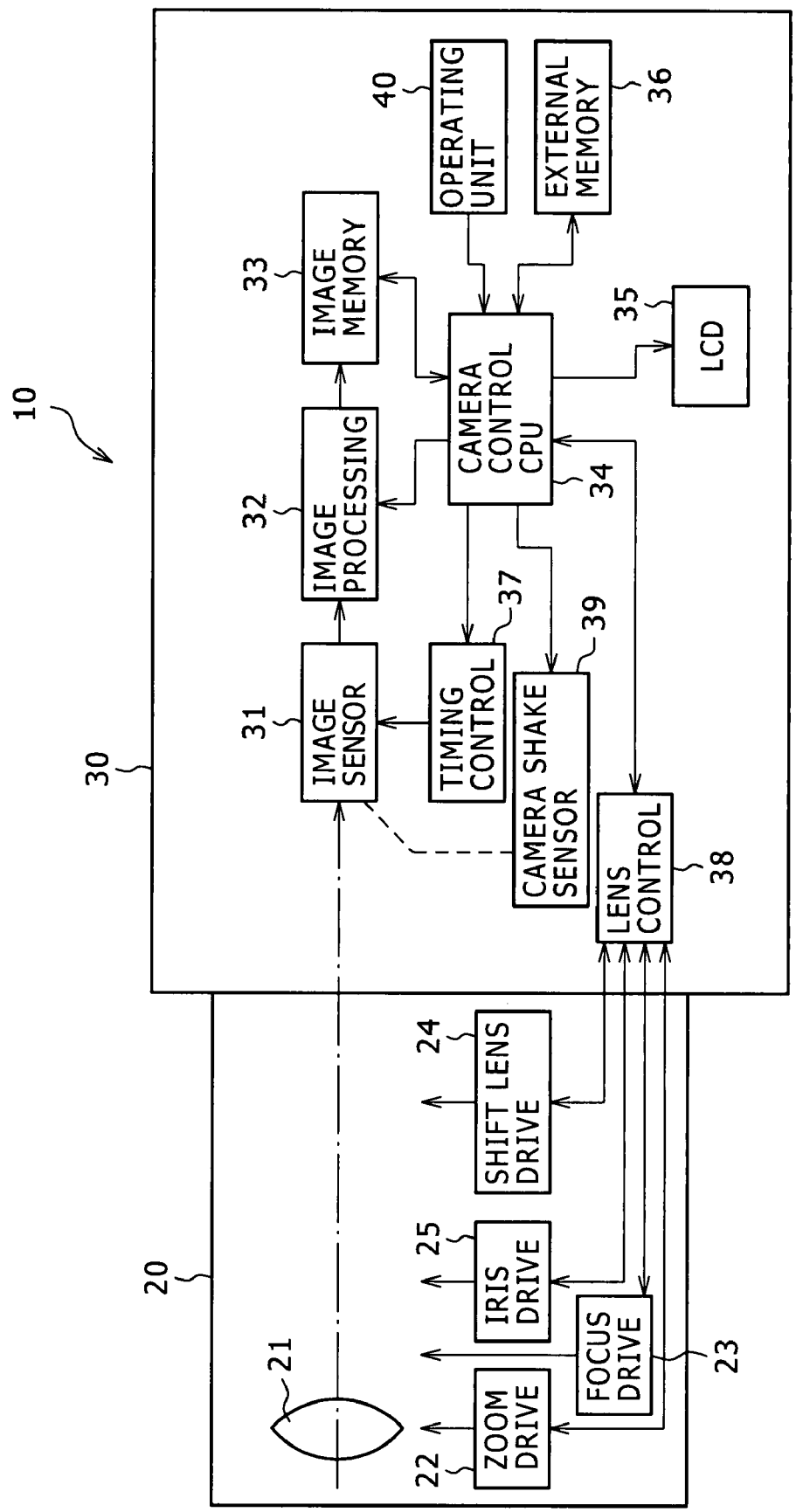
FIG. 23 is a block diagram showing one embodiment of an imaging apparatus according to the present invention.

FIG. 23 is a block diagram showing a digital still camera according to one embodiment of the imaging apparatus of the present invention.

A digital still camera 10 has a lens unit 20 for optically acquiring a subject image, and a camera body unit 30 providing functions of converting the optical subject image acquired by the lens unit 20 into electric image signals, and giving various processing to the image signals, while controlling the lens unit.

The lens unit 20 has a zoom lens 21 composed of optical elements such as lenses and filters, a zoom drive unit 22 for moving a zooming lens group during zooming, a focus drive unit 23 for moving a focusing lens group, a shift lens drive unit 24 for shifting a shift lens group in a direction to have a perpendicular component with respect to the optical axis, and an iris drive unit 25 for controlling a degree of opening of the aperture stop.

Zoom lenses applicable to the zoom lens 21 may include any of the above zoom lenses 1 to 3 or those according to their numerical embodiments or those according to embodiments of the present invention other than the above embodiments and the above numerical embodiments.

The camera body unit 30 has an image sensor 31 for converting the optical image formed by the zoom lens 21 into the electric signals.

Image sensors applicable to the image sensor 31 may include those such as CCDs (Charge Coupled Devices) and CMOSs (Complementary Metal-Oxide Semiconductors). The electric image signals outputted from the imaging device 31 are given various processing by an image processing circuit 32 and then data compression in a predetermined manner, followed by being temporarily stored as image data in an image memory 33.

A camera control CPU (Central Processing Unit) 34 is to generally control the whole camera body unit 30 as well as of the lens unit 20, and performs fetching of temporarily stored image data from the image memory 33 for display on a liquid crystal display unit 35 or for storage in an external memory 36. In addition, readout of the stored image data from the external memory 36 for display on the liquid crystal display unit 35 is also performed.

Signals from an operating unit 40 including switches such as a shutter release switch and a zooming switch are entered into the camera control CPU 34 to control various units based on the signals from the operating unit 40. When the shutter release switch is operated, for instance, a command is outputted from the camera control CPU 34 to a timing control unit 37, causing the exiting rays from the zoom lens 21 to be entered into the image sensor 31, and causing the signal readout timing with respect to the image sensor 31 to be controlled by the timing control unit 37.

Signals relating to control of the zoom lens 21 or those such as AF (Auto Focus) signals, AE (Auto Exposure) signals and zooming signals are sent from the camera control CPU 34 to a lens control unit 38, causing the zoom control unit 22, the focus drive unit 23 and the iris drive unit 25 to be controlled by the lens control unit 38 so that the zoom lens 21 goes into a predetermined condition.

In addition, the imaging apparatus also has a camera shake sensor 39 for detecting a camera shake or oscillations of the image sensor 31, for instance. When the camera shake sensor 39 detects the camera shake, a camera shake detection signal is entered into the camera control CPU 34, causing a correction signal to be generated by the camera control CPU 34. The correction signal generated is sent to the shift lens drive unit 24 included in the camera unit 20 through the lens control unit 38, causing the shift lens (or the fifth-b lens group included in the above fifth lens group L5) to be shifted by the lens shift drive unit 24 in a direction to cancel the image shift caused by the camera shake with respect to the image sensor 31.

According to the embodiments of the present invention, it is possible to provide a smaller number of optical-axially movable lens groups for attainment of adaptation to miniaturization, as well as of a reduction in imaging performance degradation caused by eccentricity.

It is noted that while the above embodiments give the imaging apparatus in the form of the digital still camera, the present invention is not limited to the digital still camera, and it is also applicable to the imaging apparatus in the form of a digital video camera.

It is also noted that all the various component shapes and numerical values previously described in each of the above embodiments are interpreted as only illustrative for embodying the present invention and not in a sense of limiting the technical scope of the present invention.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Application JP 2006-318908 filed in the Japanese Patent Office on Nov. 27, 2006, the entire contents of which being incorporated herein by reference.

What is claimed is:

1. A zoom lens having, in an order of an object-to-image direction, a first lens group having a positive refractive power and is fixed with respect to an image plane; a second lens group having a negative refractive power and is for zooming by moving on an optical axis; a third lens group having a positive refractive power and is fixed with respect to an optical axis direction; a fourth lens group having a positive refractive power and is for correcting fluctuations in imaging position by moving on the optical axis, as well as for correcting an imaging position change associated with a change in object distance; and a fifth lens group having a positive refractive power and is fixed with respect to the optical axis direction, wherein:

the fifth lens group is composed of, in the order of the object-to-image direction, a fifth-a lens group having a negative refractive power; a fifth-b lens group having a positive refractive power; and a fifth-c lens group having a positive refractive power, the fifth-a lens group is composed of, in the order of the object-to-image direction, two negative lenses which are of a first negative lens having a powerful concave surface facing toward an image, and a second negative lens having a powerful concave surface facing toward an object, a shift of the image is provided by shifting the fifth-b lens group so as to have a perpendicular component with respect to the optical axis, and a conditional expression (1) shown below is satisfied:

$$-4.0 < f5c/f5a < -1.5 \quad (1)$$

where f5a is a focal length of the fifth-a lens group, and f5c is a focal length of the fifth-c lens group.

2. The zoom lens according to claim 1, wherein a conditional expression (2) shown below is satisfied:

$$0.25 < f5b/ft < 0.4 \quad (2)$$

where f5b is a focal length of the fifth-b lens group, and ft is a focal length of an overall lens system in a telephoto end position.

3. The zoom lens according to claim 1, wherein a conditional expression (3) shown below is satisfied:

$$5 < f5/|f5a| < 7 \quad (3)$$

where f5 is a focal length of the fifth lens group.

4. The zoom lens according to claim 1, wherein a conditional expression (4) shown below is satisfied:

$$1.5 < f5/f5c < 2.5 \quad (4)$$

where f5 is a focal length of the fifth lens group.

5. The zoom lens according to claim 1, wherein a conditional expression (5) shown below is satisfied:

$$2.5 < f5/(fw \cdot ft)^{1/2} < 4 \quad (5)$$

where f5 is a focal length of the fifth lens group, fw is a focal length of the overall lens system in a wide-angle end position, and ft is a focal length of an overall lens system in a telephoto end position.

6. The zoom lens according to claim 1, wherein a conditional expression (6) shown below is satisfied:

$$0.8 < f5b/(fw \cdot ft)^{1/2} < 1.0 \quad (6)$$

where f5b is a focal length of the fifth-b lens group, fw is a focal length of the overall lens system in a wide-angle end position, and ft is a focal length of an overall lens system in a telephoto end position.

7. The zoom lens according to claim 1, wherein the fifth-b lens group is composed of a cemented lens made up of a positive lens and a negative lens which are in the order of the object-to-image direction.

8. The zoom lens according to claim 1, wherein the fourth lens group is composed of a three-cemented lens made up of a positive lens, a negative lens and a positive lens arranged in the order of the object-to-image direction.

9. The zoom lens according to claim 1, wherein the image is formed on a solid-state image sensor.

10. An imaging apparatus, comprising:

a zoom lens;

and an image sensor for converting an optical image formed by the zoom lens into electric signals, wherein:

the zoom lens includes, in an order of an object-to-image direction, a first lens group having a positive refractive power and is fixed with respect to an image plane; a second lens group having a negative refractive power and is for zooming by moving on an optical axis; a third lens group having a positive refractive power and is fixed with respect to an optical axis direction; a fourth lens group having a positive refractive power and is for correcting fluctuations in imaging position by moving on the optical axis, as well as for correcting an imaging position change associated with a change in object distance; and a fifth lens group having a positive refractive power and is fixed with respect to the optical axis direction;

the fifth lens group is composed of, in the order of the object-to-image direction, a fifth-a lens group having a negative refractive power; a fifth-b lens group having a positive refractive power; and a fifth-c lens group having a positive refractive power, the fifth-a lens group is composed of, in the order of the object-to-image direction, two negative lenses of a first negative lens having a powerful concave surface facing toward an image and a second negative lens having a powerful concave surface facing toward an object;

a shift of the image is provided by shifting the fifth-b lens group so as to have a perpendicular component with respect to the optical axis, and a conditional expression (1) shown below is satisfied:

$$-4.0 < f5c/f5a < -1.5 \quad (1)$$

where f5a is a focal length of the fifth-a lens group, and f5c is a focal length of the fifth-c lens group.

* * * * *